US010829602B2

United States Patent
Jiang et al.

(10) Patent No.: US 10,829,602 B2
(45) Date of Patent: Nov. 10, 2020

(54) TRANSPARENT AND HOMOGENOUS CELLULOSE NANOCRYSTAL-LIGNIN UV PROTECTION FILMS

(71) Applicant: Auburn University, Auburn, AL (US)

(72) Inventors: Zhihua Jiang, Auburn, AL (US); Mahesh Parit, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 16/358,921

(22) Filed: Mar. 20, 2019

(65) Prior Publication Data

US 2019/0292340 A1  Sep. 26, 2019

Related U.S. Application Data

(60) Provisional application No. 62/645,581, filed on Mar. 20, 2018.

(51) Int. Cl.
| | |
|---|---|
| C08J 5/18 | (2006.01) |
| B01J 19/12 | (2006.01) |
| C08L 1/08 | (2006.01) |
| C08B 15/04 | (2006.01) |
| D21H 21/48 | (2006.01) |
| G02B 5/22 | (2006.01) |
| G02B 5/20 | (2006.01) |
| C08H 7/00 | (2011.01) |
| C08L 1/04 | (2006.01) |
| B82Y 30/00 | (2011.01) |

(52) U.S. Cl.
CPC .............. *C08J 5/18* (2013.01); *B01J 19/123* (2013.01); *C08B 15/04* (2013.01); *C08H 6/00* (2013.01); *C08L 1/04* (2013.01); *C08L 1/08* (2013.01); *D21H 21/48* (2013.01); *G02B 5/208* (2013.01); *G02B 5/223* (2013.01); *B82Y 30/00* (2013.01); *C08J 2301/02* (2013.01); *C08J 2497/00* (2013.01)

(58) Field of Classification Search
None
See application file for complete search history.

(56) References Cited

U.S. PATENT DOCUMENTS

| | | |
|---|---|---|
| 3,585,104 A | 6/1971 | Kleinert |
| 5,629,055 A | 5/1997 | Revol et al. |

FOREIGN PATENT DOCUMENTS

| | | |
|---|---|---|
| WO | 2012156652 | 11/2012 |

OTHER PUBLICATIONS

Machine translation of WO-2012/156652, European Patent Office, [online], retrieved from the Internet, [retrieved May 22, 2020], <URL:https://worldwide.espacenet.com/>. (Year: 2020).*

(Continued)

*Primary Examiner* — Dennis R Cordray
(74) *Attorney, Agent, or Firm* — Christopher M. Scherer, Esq.; Joseph T. Leone, Esq.; DeWitt LLP

(57) ABSTRACT

A visibly transparent, homogeneous UV-blocking cellulose nanocrystal/lignin nanocomposite film and a method of making the same. The film is made by dispersing cellulose nanocrystals and lignin in an aqueous, alkaline solution to yield a dispersion; casting the dispersion onto a substrate; and evaporating the aqueous, alkaline solution to yield a homogeneous, visibly transparent film that at least partially absorbs ultraviolet (UV) radiation.

18 Claims, 17 Drawing Sheets

(56) References Cited

OTHER PUBLICATIONS

Aloui et al., "Inorganic UV absorbers for the photostabilisation of wood-clearcoating systems: Comparison with organic UV absorbers," *Appl. Surf. Sci.* 2007, 253, 3737-3745.

Cachet et al., "Esterification of organosolv lignin under supercritical conditions," Ind. Crops Prod. 2014, 58, 287-297.

Dutra et al., "Determination of sun protection factor (SPF) of sunscreens by ultraviolet spectrophotometry," *Rev. Bras. Cienc. Farm.* 2004, 40, 381-385.

Falkehag and Marton, "Chromophores in Kraft Lignin," *Advances in Chemistry*, 1966, vol. 59, chapter 7, pp. 75-89, ISBN 978-0-841-20060-9.

George and Sabapathi, "Cellulose nanocrystals: synthesis, functional properties, and applications," *Nanotechnol. Sci. Appl.* 2015, 8, 45-54.

Gilarranz et al., "Phenolic OH group estimation by FTIR and UV spectroscopy, Application to organosolv lignins," *J. Wood Chem. Technol.* 2001, 21, 387-395.

Gosselink et al., "Co-ordination network for lignin—standardisation, production and applications adapted to market requirements (EUROLIGNIN)," *Ind. Crops Prod.* 2004, 20, 121-129.

Heggset et al., "Temperature stability of nanocellulose dispersions," *Carbohydr. Polym.* 2017, 157, 114-121.

Lin and Dence, *Methods in Lignin Chemistry;* Springer-Verlag: Berlin, New York, © 1992; ISBN 978-3-642-74067-1 (Book).

Mondal, S. "Preparation, properties and applications of nanocellulosic materials," *Carbohydr. Polym.* 2017,163, 301-316.

Phan-Xuan et al., "Aggregation behavior of aqueous cellulose nanocrystals: the effect of inorganic salts," *Cellulose* 2016, 23, 3653-3663.

Reid et al., "Benchmarking cellulose nanocrystals: from the laboratory to industrial production," *Langmuir* 2017, 33, 1583-1598.

Sadeghifar et al., "Cellulose-Lignin Biodegradable and Flexible UV Protection Film," *ACS Sustainable Chem. Eng.* 2017, 5, 625-631.

Silvestre and Cimmino, "*Ecosustainable Polymer Nanomaterials for Food Packaging: Innovative Solutions, Characterization Needs, Safety and Environmental Issues,*"CRC Press, © 2013 (Book).

Vallejo et al. "Evaluation of the avobenzone photostability in solvents used in cosmetic formulations," *Vitae* 2011, 18, 63-71.

Vishtal and Kraslawski, "Challenges in industrial applications of technical lignins," *Bio Resources* 2011, 6, 3547-3568.

Wu et al., "Green composite films prepared from cellulose, starch and lignin in room-temperature ionic liquid," *Bioresour. Technol.* 2009, 100, 2569-2574.

Xiong et al., "Transparent nanocomposite films of lignin nanospheres and poly(vinyl alcohol) for UV-absorbing," *Ind. Eng. Chem. Res.* 2018, 57, 1207-1212.

Hambardzumyan et al., "Natural organic UV-absorbent coatings based on cellulose and lignin: designed effects on spectroscopic properties," Biomacromolecules, 2012, 13:4081-4088.

Hambardzumyan et al., "Organosols lignin as a natural grafting additive to improve the water resistance of films using cellulose nanocrystals", Chemical Engineering Journal, 2015, 264:780-788.

Parit et al., "Transparent and homogenous cellulose nanocrystal/lignin UV-protection films", ACS Omega, 2018, 3:10679-10691.

International Search Report and Written Opinion for PCT/US2019/023083 dated May 27, 2019.

* cited by examiner

TRANSPARENT AND HOMOGENOUS CELLULOSE NANOCRYSTAL-LIGNIN UV PROTECTION FILMS

CROSS-REFERENCE TO RELATED APPLICATIONS

Priority is hereby claimed to provisional application Ser. No. 62/645,581, filed Mar. 20, 2018, which is incorporated herein by reference.

BACKGROUND

Biomass-derived materials are promising alternatives to petroleum-based polymers due to their sustainability and biodegradability. Cellulose, lignin, and hemicellulose, the major structural components of trees and various plants, are the most abundant, naturally available, easily renewable, biomass-based materials.

Cellulose nanocrystals (CNCs) are the crystals derived from acid hydrolysis of native cellulose. Generally speaking, CNCs (as that term is used herein) are acicular/elliptical particles having a minor cross-sectional diameter (i.e., width) of from between about 4 nm and about 25 nm and a major cross-sectional diameter (i.e., length) of from between about 100 nm and about 1000 nm. CNC's are fascinating nanomaterials due to their physical characteristics, including nanoscale dimension, high specific strength and stiffness, high surface area, ease of processing, and cost effectiveness. Mondal, S. "Preparation, properties and applications of nanocellulosic materials," *Carbohydr. Polym.* 2017, 163, 301-316. Moreover, CNCs possess interesting optical properties due to their chiral nematic self-assembly. Controlling this behavior would facilitate their use in applications, such as security papers, mirrorless lasing, and polarizing films. See, for example, U.S. Pat. No. 5,629,055, issued May 13, 1997, to Revol et al.

Lignin is the second-most abundant renewable carbon source after cellulose. Lignin it is an amorphous, polyphenolic, branched structure formed from enzyme-assisted dehydrogenative polymerization of phenyl propanoid units. (Lin and Dence, *Methods in Lignin Chemistry*; Springer-Verlag: Berlin, N.Y., ©1992; ISBN 978-3-642-74067-1.) Annually, five million metric tons of lignin is produced worldwide. The vast majority of this lignin is discarded or burned as non-commercial waste. (Vishtal and Kraslawski, "Challenges in industrial applications of technical lignins," Bio Resources 2011, 6, 3547-3568.) In pulp and paper industries, lignin is a main component of black liquor produced from the kraft process. Currently, the primary use of this lignin-based waste product is to produce energy. As of 2004, only about 2% of all industrial lignins and only about 100,000 tons of kraft lignins were valorized per year, worldwide. Gosselink et al., "Co-ordination network for lignin-standardisation, production and applications adapted to market requirements (EUROLIGNIN)," *Ind. Crops Prod.* 2004, 20, 121-129.

Lignin is a natural UV blocker due to its functional groups, such as phenolic units, ketones, and other chromophores. (Falkehag and Marton, "Chromophores in Kraft Lignin," *Advances in Chemistry*, 1966, vol. 59, chapter 7, pp. 75-89, ISBN 978-0-841-20060-9.) The aromatic structure of lignin can increase thermal and oxidation stabilities of polymers in blends and the free-radical-scavenging ability of its phenolic groups gives lignin excellent antioxidant properties. (See, for example, Sadeghifar et al., "Cellulose-Lignin Biodegradable and Flexible UV Protection Film," *ACS Sustainable Chem. Eng.* 2017, 5, 625-631.)

Currently, organic and inorganic UV blockers are widely used for UV-protection applications. Organic absorbers are often toxic and degrade upon exposure to sunlight. Inorganic UV-blocking agents, such as ZnO and $TiO_2$, are mostly used in the form of nanoparticles. However, inorganic UV blockers require higher loading for complete UV blocking, which often leads to agglomeration. The agglomeration in turn leads to reduced transparency of the resultant polymer nanocomposite films. Some of the known coatings developed for UV-blocking applications that use inorganic particles also exhibit higher absorption in the visible region. In short, these types of coatings are opaque. See, for example, Silvestre and Cimmino, "*Ecosustainable Polymer Nanomaterials for Food Packaging: Innovative Solutions, Characterization Needs, Safety and Environmental Issues*," CRC Press, © 2013; Vallejo et al. "Evaluation of the avobenzone photostability in solvents used in cosmetic formulations," *Vitae* 2011, 18, 63-71; and Aloui et al., "Inorganic UV absorbers for the photostabilisation of wood-clearcoating systems: Comparison with organic UV absorbers," *Appl. Surf Sci.* 2007, 253, 3737-3745.

A common challenge in engineering new nanocellulose-lignin-based materials is incompatibility between hydrophilic cellulose and hydrophobic lignin. In addition, at neutral pH and in the absence of chemical additives, both CNC and lignin have a negative charge and therefore there is an electrostatic repulsion between them. It was noticed that non-derivatized cellulose/lignin films could be formed using green solvents, such as ionic liquids, but this approach is not economical due to the high cost of the non-ionic solvents. (Wu et al., "Green composite films prepared from cellulose, starch and lignin in room-temperature ionic liquid," *Bioresour. Technol.* 2009, 100, 2569-2574.) Other approaches using organic solvent systems, such as dimethyl sulfoxide/water and dioxane/water, do not yield homogenous films. (Hambardzumyan et al., "Natural organic UV-absorbent coatings based on cellulose and lignin: designed effects on spectroscopic properties," *Biomacromolecules* 2012, 13, 4081-4088).

To compatibilize CNC and lignin, several attempts were carried out through covalent bond formation. See Sadeghifar et al., "Cellulose-Lignin Biodegradable and Flexible UV Protection Film," *ACS Sustainable Chem. Eng.* 2017, 5, 625-631 and Hambardzumyan et al. "Organosolv lignin as natural grafting additive to improve the water resistance of films using cellulose nanocrystals," *Chem. Eng. J.* 2015, 264, 780-788. Sadeghifar et al. (supra) have produced flexible cellulose/lignin UV-blocking films containing low amounts of covalently bonded lignin. In this procedure, azide-modified cellulose microcrystals dissolved in dimethylacetamide/lithium chloride were reacted with propargylated softwood kraft lignin (SKL) to produce 0.5, 1, and 2 wt % lignin-containing materials. Cellulose films were then prepared by regeneration in acetone. Cellulose film containing 2% lignin showed almost 100% absorption of UV-B rays (wavelengths from ~280 nm to ~320 nm) and a majority of UV-A rays (wavelengths from ~320 nm to ~400 nm). The obtained films were uniform, but the procedure requires using organic solvents and long preparation times.

Another approach reported in the literature for covalent bond formation between cellulose nanocrystal and lignin was using Fenton's reagent ($H_2O_2$ and FeSO4) as an initiator. Hambardzumyan et al. 2015, supra. This approach increased covalent and noncovalent bonds between both polymers and contributed to the increase in the water resistance of coated films on quartz slides and in water retention in self-supported films as a hydrogel film. Natural UV-absorbent coatings prepared from CNC and dehydrogenation polymer or organosolv lignin (see U.S. Pat. No. 3,585,104) by simple evaporation of the colloidal blended mixture have also been reported. See Hambardzumyan et al. 2012, supra. These materials were in the form of thin films and are transparent on glass or quartz slides, with variable antireflective or UV-absorbent properties (depending on the process used). In these materials, lignin and CNC interact through noncovalent and electrostatic forces. The homogeneity and hydrophobicity of these materials were not reported.

Water-soluble polymers, such as poly(vinyl alcohol), have been used to prepare lignin-based transparent films. The resultant nanocomposite films, however, were not fully biodegradable. See Xiong et al., "Transparent nanocomposite films of lignin nanospheres and poly(vinyl alcohol) for UV-absorbing," *Ind. Eng. Chem. Res.* 2018, 57, 1207-1212.

SUMMARY

CNC can form transparent films or coatings, and lignin is a naturally available and biodegradable UV blocker. CNC and lignin can also be synergistically used to obtain the films with high transparency and UV-absorption properties.

The present work shows for the first time that homogenous and transparent films of CNC, with and without the presence of lignin, can be processed, optionally without the use of organic solvents. The simple and novel approach shown in this work for CNC and CNC/lignin nanocomposite film preparation uses aqueous alkaline solvent containing sodium hydroxide (NaOH). CNC and alkaline lignin (AL) or softwood kraft lignin (SKL) is compatibilized in this aqueous alkaline suspension. The CNC, CNC/AL and CNC/SKL films were casted using aqueous alkaline mixture containing optimal NaOH concentration. The resultant homogenous, transparent films were characterized for their structural, optical, thermal, and hydrophobic properties.

Thus, disclosed and claimed herein are:

1. A composition of matter prepared by a process comprising:

(a) dispersing cellulose nanocrystals and lignin in an aqueous, alkaline solution to yield a dispersion;

(b) casting the dispersion of step (a) onto a substrate; and then (c) evaporating the aqueous, alkaline solution for a time and at a temperature to yield a homogeneous, visibly transparent film that at least partially absorbs ultraviolet (UV) radiation falling within a wavelength range selected from the group consisting of ultraviolet A (UVA, about 315 nm to about 400 nm), ultraviolet B (UVB, about 280 nm to about 315 nm) and ultraviolet C (UVC, about 100 nm to about 280 nm).

2. The composition of matter of Claim 1, wherein in step (a), the aqueous, alkaline solution comprises NaOH dissolved in water.

3. The composition of matter of any preceding claim, wherein in step (a), the aqueous, alkaline solution comprises NaOH dissolved in a mixture of water and an aprotic solvent.

4. The composition of matter of any preceding claim, wherein in step (a), the aqueous, alkaline solution comprises NaOH dissolved in a mixture of water and a polar, aprotic solvent.

5. The composition of matter of any preceding claim, wherein step (a) comprises dispersing a lignin selected from the group consisting of acetylated lignin, alkaline lignin, and softwood kraft lignin.

6. The composition of matter of any preceding claim, wherein step (a) comprises:

(i) dispersing cellulose nanocrystals in a first solvent comprising water to yield a first dispersion;

(ii) dispersing lignin in a second solvent comprising an aprotic solvent to yield a second dispersion;

(iii) combining at least a portion of the first dispersion with at least a portion of the second dispersion to yield a third dispersion; and then (iv) adding a base to the third dispersion to yield the dispersion of step (a).

7. The composition of matter of any preceding claim, wherein in step (a) the aqueous, alkaline solution comprises from about 0.5 wt % NaOH to about 15 wt % NaOH based on the weight of cellulose nanocrystals in the dispersion.

8. The composition of matter of any preceding claim, wherein in step (a) the aqueous, alkaline solution comprises from about 1 wt % NaOH to about 10 wt % NaOH based on the weight of cellulose nanocrystals in the dispersion.

9. The composition of matter of any preceding claim, wherein in step (a) the aqueous, alkaline solution comprises from about 2 wt % NaOH to about 5 wt % NaOH based on the weight of cellulose nanocrystals in the dispersion.

10. The composition of matter of any preceding claim, wherein the lignin is present in the dispersion in a concentration of from about 1 wt % lignin to about 10 wt % lignin based on the weight of cellulose nanocrystals in the dispersion.

11. The composition of matter of any preceding claim, wherein the lignin is present in the dispersion in a concentration of from about 1 wt % lignin to about 5 wt % lignin based on the weight of cellulose nanocrystals in the dispersion.

12. The composition of matter of any preceding claim, wherein the cellulose nanocrystals are present in the dispersion in a concentration of from about 1 wt % cellulose nanocrystals to about 10 wt % cellulose nanocrystals based on the weight of the aqueous, alkaline solution.

13. A method of making a UV-blocking film, the method comprising:

(a) dispersing cellulose nanocrystals in an aqueous, alkaline solution to yield a dispersion;

(b) casting the dispersion of step (a) onto a substrate; and then (b) evaporating the aqueous, alkaline solution for a time and at a temperature to yield a homogeneous, visibly transparent film that at least partially absorbs ultraviolet (UV) radiation falling within a wavelength range selected from the group consisting of ultraviolet A (UVA, about 315 nm to about 400 nm), ultraviolet B (UVB, about 280 nm to about 315 nm) and ultraviolet C (UVC, about 100 nm to about 280 nm).

14. The method of Claim 13, wherein in step (a) further comprises dispersing lignin in the aqueous, alkaline solution.

15. The method of Claim 13 or 14, wherein in step (a), the aqueous, alkaline solution comprises NaOH dissolved in water.

16. The method of any one of Claims 13-15, wherein in step (a), the aqueous, alkaline solution comprises NaOH dissolved in a mixture of water and an aprotic solvent.

17. The method of any one of Claims 13-16, wherein in step (a), the aqueous, alkaline solution comprises NaOH dissolved in a mixture of water and a polar, aprotic solvent.

18. The method of any one of Claims 13-17, wherein step (a) further comprises dispersing lignin in the aqueous, alkaline solution and the lignin is selected from the group consisting of acetylated lignin, alkaline lignin, and softwood kraft lignin.

19. The method of any one of Claims 13-18, wherein step (a) comprises:

(i) dispersing cellulose nanocrystals in a first solvent comprising water to yield a first dispersion;

(ii) dispersing lignin in a second solvent comprising an aprotic solvent to yield a second dispersion;

(iii) combining at least a portion of the first dispersion with at least a portion of the second dispersion to yield a third dispersion; and then (iv) adding an alkaline, aqueous solution to the third dispersion to yield the dispersion of step (a).

20. The method of any one of Claims 13-19, wherein in step (a) the aqueous, alkaline solution comprises from about 0.5 wt % NaOH to about 15 wt % NaOH based on the weight of cellulose nanocrystals in the dispersion.

21. The method of any one of Claims 13-20, wherein in step (a) the aqueous, alkaline solution comprises from about 1 wt % NaOH to about 10 wt % NaOH based on the weight of cellulose nanocrystals in the dispersion.

22. The method of any one of Claims 13-21, wherein in step (a) the aqueous, alkaline solution comprises from about 2 wt % NaOH to about 5 wt % NaOH based on the weight of cellulose nanocrystals in the dispersion.

23. The method of any one of Claims 13-22, wherein the lignin is present in the dispersion in a concentration of from about 1 wt % lignin to about 10 wt % lignin based on the weight of cellulose nanocrystals in the dispersion.

24. The method of any one of Claims 13-23, wherein the lignin is present in the dispersion in a concentration of from about 1 wt % lignin to about 5 wt % lignin based on the weight of cellulose nanocrystals in the dispersion.

25. The method of any one of Claims 13-24, wherein the cellulose nanocrystals are present in the dispersion in a concentration of from about 1 wt % cellulose nanocrystals to about 10 wt % cellulose nanocrystals based on the weight of the aqueous, alkaline solution.

DETAILED DESCRIPTION

Abbreviations and Definitions

Figure 1:
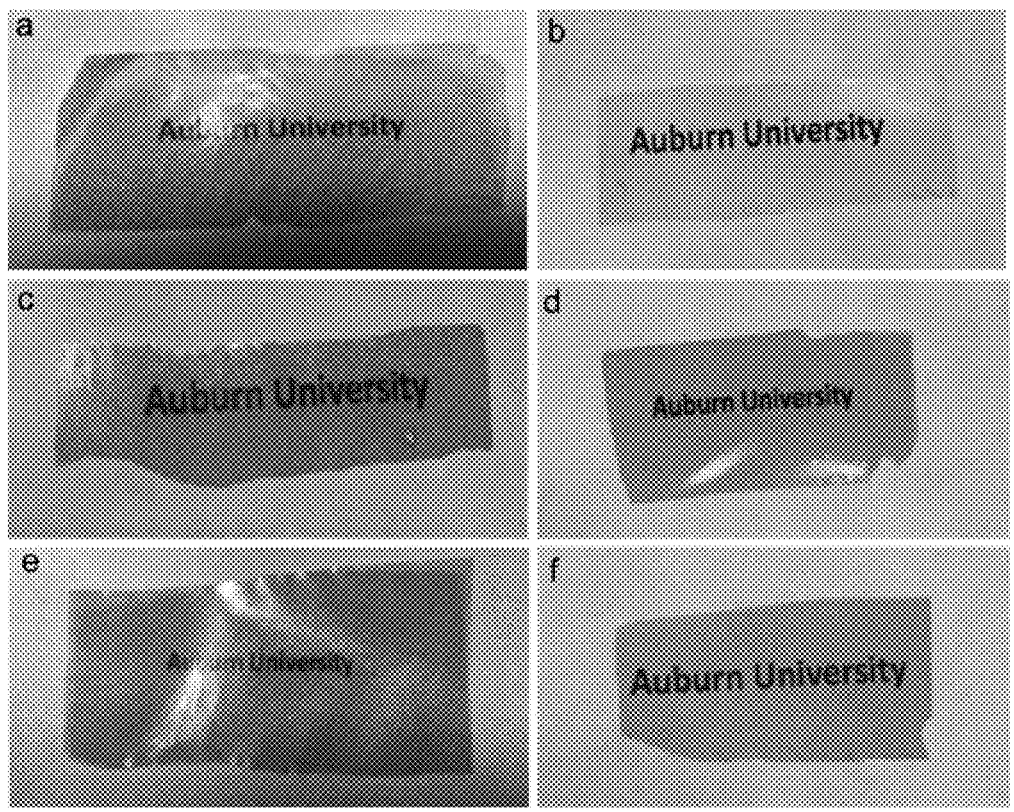
FIG. 1 is a series of photographs of cellulose nanocrystalline ("CNC")-based films from aqueous suspensions at varying pH. CNC films at (a) pH 7, (b) pH 11.5. CNC/AL (2 wt %) films at (c) pH 7, (d) pH 11.5. CNC/SKL (2 wt %) films at (e) pH 7, (f) pH 11.5.

Ac-SKL=acetylated softwood kraft lignin.
AFM=atomic force microscopy.
AL=alkaline lignin. This is a commercial product (CAS No. 8068-05-1) which is lignin obtained from kraft pulping. The lignin has been treated with NaOH during the kraft puling process. It can be obtained from a number of sources, such as Sigma-Aldrich, St. Louis Mo.

An "aprotic solvent" is solvent that does not contain acidic hydrogen groups, and thus does not behave as a Brønsted-Lowry acid under commonly encountered conditions. They do not participate to any appreciable degree in hydrogen bonding. Non-exclusive examples of aprotic solvents include perfluorohexane, α,α,α-trifluorotoluene, pentane, hexane, cyclohexane, methylcyclohexane, decalin, dioxane, carbon tetrachloride, freon-11, benzene, toluene, triethyl amine, carbon disulfide, diisopropyl ether, diethyl ether, t-butyl methyl ether (MTBE), chloroform, ethyl acetate, 1,2-dimethoxyethane (glyme), 2-methoxyethyl ether (diglyme), tetrahydrofuran (THF), methylene chloride, pyridine, 2-butanone (MEK), acetone, hexamethylphosphoramide, N-methylpyrrolidinone (NMP), nitromethane, dimethylformamide (DMF), acetonitrile, sulfolane, dimethyl sulfoxide (DMSO), propylene carbonate, and the like. Polar aprotic solvents are those aprotic solvents having a dielectric constant above about 20. Polar aprotic solvents are those aprotic solvents that exhibit a dipole moment, including dioxane, acetone, DMF, acetonitrile, and DMSO.

CNC=cellulose nanocrystalline or cellulose nanocrystals (depending on the context). This definition includes cellulose nanocrystals of any morphology, particle size, or particle size distribution. Cellulose nanocrystals can be obtained commercially from several sources (for example CelluForce, Montreal, Quebec, Canada) or fabricated de novo by literature methods. See, for example George and Sabapathi, "Cellulose nanocrystals: synthesis, functional properties, and applications," *Nanotechnol. Sci. Appl.* 2015, 8, 45-54.

FTIR=Fourier Transform Infrared.

"Lignin" is used broadly herein to denote lignin derived from any plant source, without limitation, and including lignin resulting from any type of wood-pulping or paper-making process.

"Organosolv" is a pulping technique that uses an organic solvent to solubilize lignin and hemicellulose. It has been considered in the context of both pulp and paper manufacture and bio-refining for subsequent conversion of cellulose to fuel ethanol. The process was invented by Theodor Kleinert in 1968 as an environmentally benign alternative to kraft pulping. See U.S. Pat. No. 3,585,104, issued Jun. 15, 1971, to T. N. Kleinert.

RMS=root mean square.

SEM=scanning electron microscopy.

SKL=softwood kraft lignin, i.e., lignin produced by the kraft pulping of softwoods such as pine and spruce.

TGA=thermogravimetric analysis.

$\zeta$ potential=zeta potential. Zeta potential is a measure of electro-kinetic potential in a colloidal dispersion. It is typically measured in volts or milli-volts. Zeta potential is a key indicator of the stability of a colloidal dispersion. The magnitude of the zeta potential indicates the degree of electrostatic repulsion between adjacent, similarly charged particles in a colloid. A large value for zeta potential confers stability to the colloidal dispersion. That is, the dispersion will resist aggregation/agglomeration/flocculation (these terms are used synonymously herein) due to the electrostatic repulsion and kinetic forces between the suspended particles. However, when the zeta potential is sufficiently small, attractive forces will exceed the electrostatic and kinetic repulsion and the dispersion will breakdown and flocculate. Thus, colloids with a large zeta potential (either positive or negative) are electrically stabilized, while colloids with a small zeta potential tend to flocculate. Colloids with a $\zeta$ potential above about +/−40 mV have good to excellent stability.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made. The indefinite articles "a" and "an" mean "one or more" unless clearly stated to the contrary.

All combinations of method or process steps as used herein can be performed in any order, unless otherwise specified or clearly implied to the contrary by the context in which the referenced combination is made.

The methods and compositions of matter disclosed herein can comprise, consist of, or consist essentially of the essential elements, limitations, and/or steps of the method or composition described, as well as any additional or optional ingredients, components, or limitations described herein or otherwise useful in synthetic organic chemistry.

Structural and Morphological Properties:

CNC and CNC/lignin films were prepared by casting an aqueous colloidal suspension and CNC or a mixture of CNC and lignin, followed by drying the colloids at room temperature. As shown in FIG. 1, panel (a), CNC film prepared at neutral pH showed iridescent colors. This iridescence is caused by the chiral nematic ordering of CNC upon drying. Films prepared by adding 2 wt % alkaline lignin ("AL") and 2 wt % softwood kraft lignin ("SKL") in aqueous CNC suspension did not affect the chiral nematic assembly of the CNC and retained iridescence, as shown in FIG. 1, panel (c) (2 wt % AL) and panel (e) (2 wt % SKL). AL is a water-soluble form of lignin and produced homogenous films when cast from aqueous colloidal suspensions with CNC. See. FIG. 1, panel (c). In contrast, SKL gave non-homogenous films when cast from aqueous colloidal suspensions with CNC. See FIG. 1, panel (e). This is surely due to SKL's relatively low solubility in water.

It was observed that under alkaline conditions (pH 11.5), the chiral nematic ordering of CNC disappeared completely and produced highly transparent films. See FIG. 1, panel (b). Although the effects of electrolytes and pH on the aqueous-phase behavior of the CNC have been studied for the various inorganic salts, their effect on film transparency has not been explored. Most studies involved the effect of small electrolyte concentrations on potential, particle size, pitch length, alignment and phase formation in aqueous CNC suspensions. See, for example, Phan-Xuan et al., "Aggregation behavior of aqueous cellulose nanocrystals: the effect of inorganic salts," *Cellulose* 2016, 23, 3653-3663.

Figure 2A:
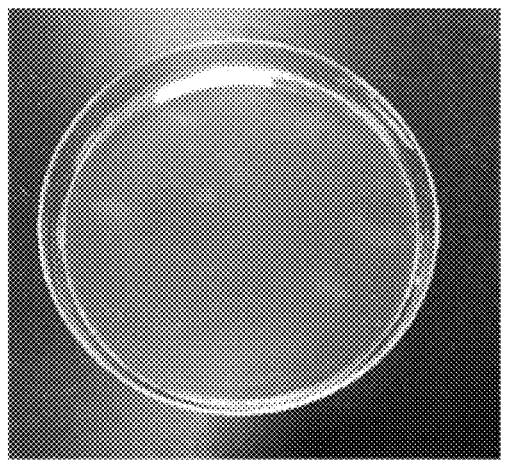
FIG. 2A is a photograph of a CNC film with 4 wt % NaOH.
Figure 2B:
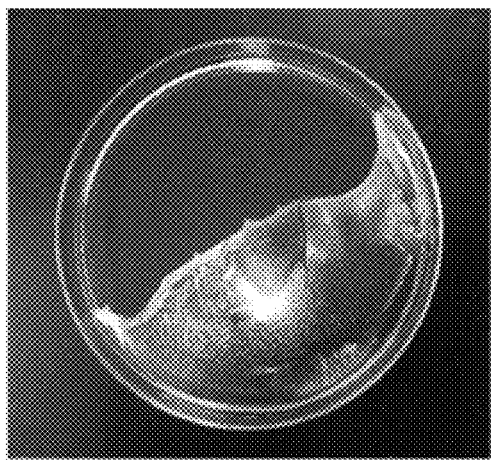
FIG. 2B is a photograph of a CNC film without NaOH addition.

Alkaline condition used in preparing the CNC/lignin films disclosed in this work showed the effect of NaOH on the film transparency. To the inventors' knowledge, this is the first attempt to show the effect of alkaline conditions generally, and adding NaOH specifically, on the transparency of CNC films. Without being limited to any underlying phenomenon or mechanism, it is thought that the sodium counter-ions in NaOH hinder chiral interactions between the CNC rods and thus leads to transparent films. (See below). The disruption of these chiral interactions is also thought to aid in forming uniform films by reducing shrinkage during the drying process. As shown in contrasting FIG. 2A to FIG. 2B, a CNC film with 4 wt % NaOH (shown in FIG. 2A) formed uniform film throughout the Petri dish; whereas a pure CNC film (shown in FIG. 2B) shrank upon drying and produced an iridescent film of uneven thickness. Shrinkage in the pure CNC film shown in FIG. 2B is believed to be caused by the hydrogen bonding between hydroxyl groups on the surface of the CNC. Adding NaOH introduces the sodium and hydronium counter ions, which are thought to reduce the hydrogen bonding between the hydroxyl groups in the CNC.

Adding lignin to the alkaline aqueous CNC suspensions produced transparent and homogeneous films of CNC/AL and CNC/SKL. See FIG. 1, panels (d) and (f), respectively.

In addition to eliminating iridescence, adding NaOH also helped in uniformly dispersing the SKL in suspension and producing the homogenous CNC/SKL films seen in FIG. 1, panels (d) and (f). It is thought that such uniformity results from alkaline conditions that are at or exceed the pKa of the aromatic hydroxyl groups of the lignin. Without being limited to any underlying mechanism, it is thought that the deprotonation of these hydroxyl groups produces phenolate anions, which stabilize the lignin molecules in aqueous suspension via electrostatic repulsion. The uniform dispersion of the lignin in the aqueous suspension is then retained in the dried films, thereby producing highly homogenous and visibly transparent CNC/lignin films.

Figure 3A:
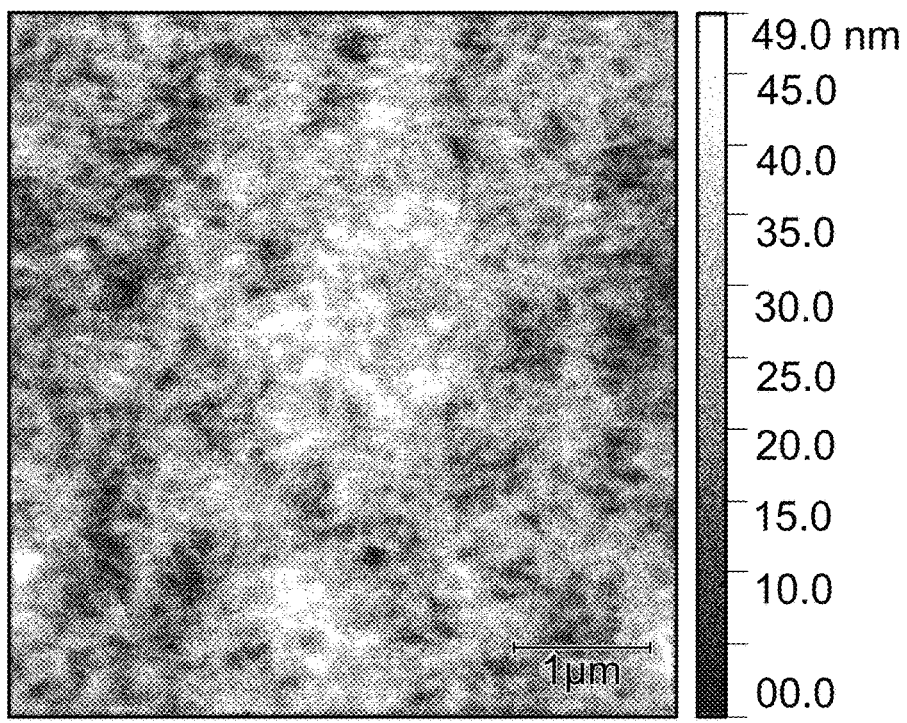
FIG. 3A is a topographical image of a CNC/AL (10 wt %) film.
Figure 3B:
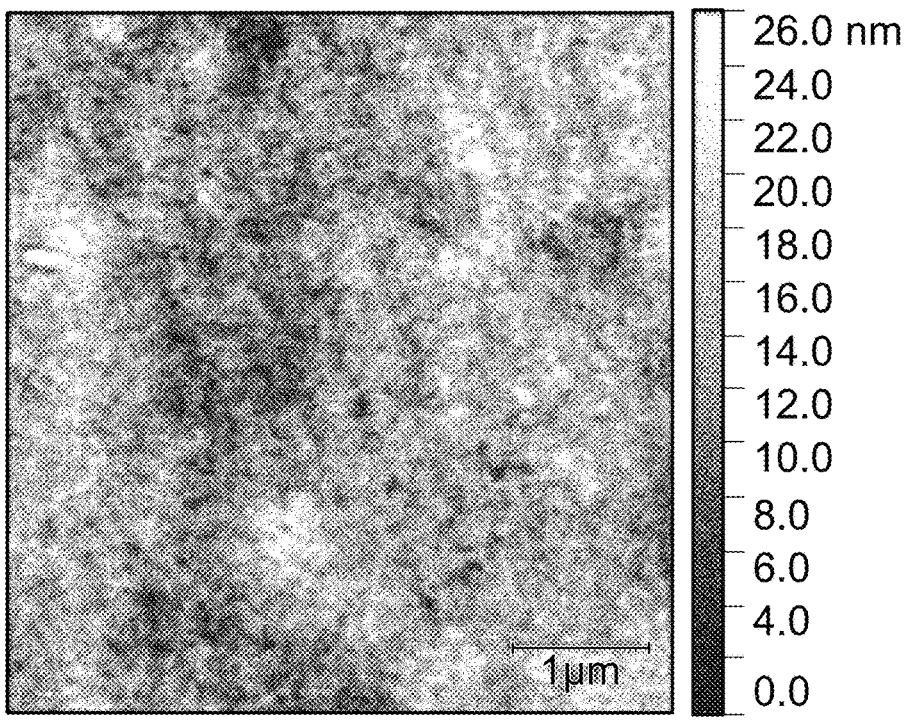
FIG. 3B is a topographical image of a CNC/SKL (10 wt %) film.

The root-mean-square (RMS) roughness of the CNC/lignin films was also measured using atomic force microscopy (AFM). The average RMS roughness values were 7.3±1.3, 13.3±2.1, and 12.9±1.4 nm for CNC, CNC/AL (10 wt %), and CNC/SKL (10 wt %), respectively. Topographical AFM images of the 10 wt % CNC/AL film (FIG. 3A) and 10 wt % CNC/SKL films (FIG. 3B) show the homogeneity of the lignin dispersion in the CNC matrix.

Figure 4:
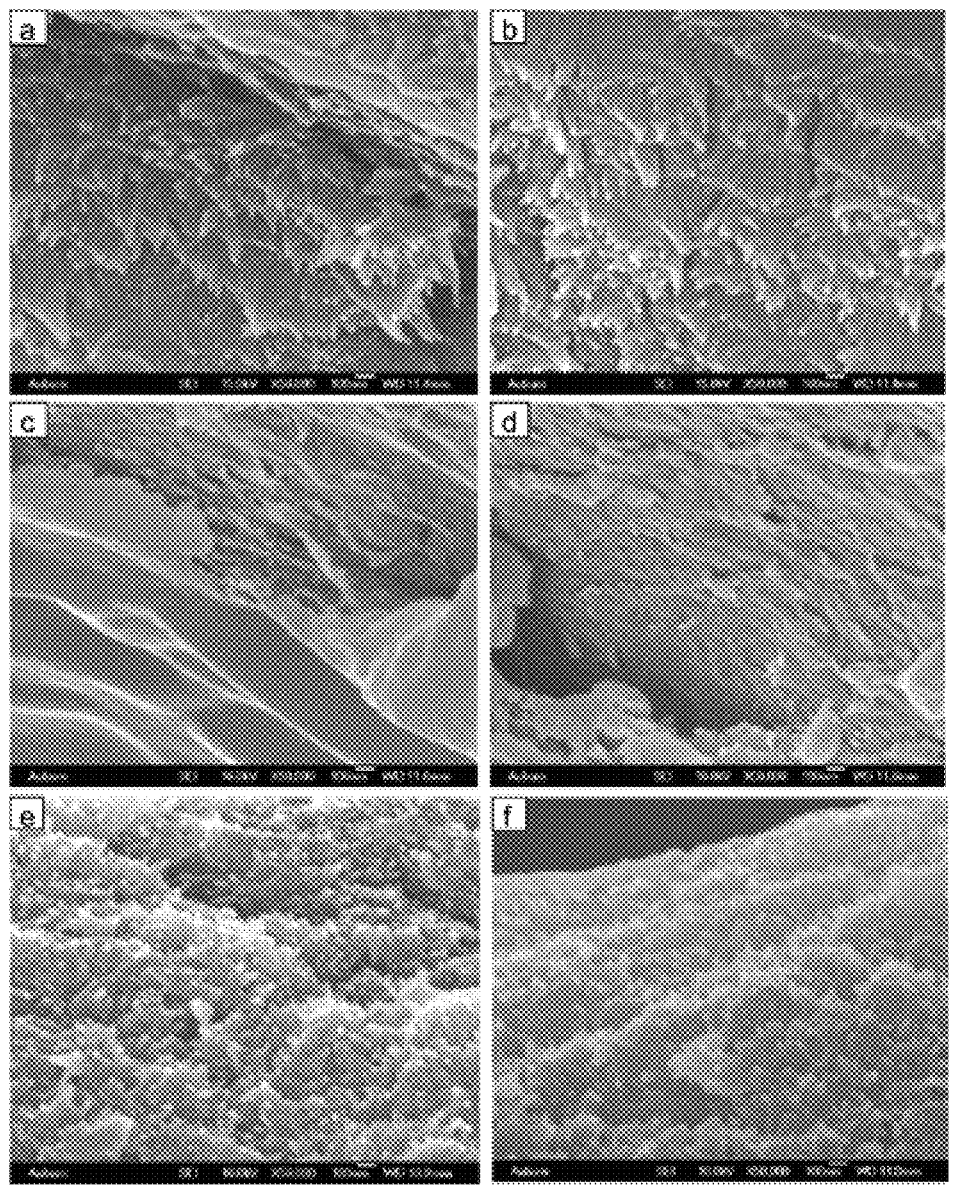
FIG. 4 is a series of scanning electron microscopy images of various CNC films. Panels (a) and (b) show a CNC film without added NaOH. Panels (c) and (d) depict a CNC film with 4 wt % NaOH. Panels (e) and (f) depicts and CNC/SKL (10 wt %) film.

Structural features of the CNC rod self-assembly can also be observed from scanning electron microscopy (SEM) images taken across slanted cross-sections of the films. See FIG. 4. As shown in FIG. 4, panels (a) and (b), the chiral, nematically arranged rods across the film thickness are clearly visible. The different locally nematic layers of CNC are oriented in various directions, giving rise to overall helical chiral nematic self-assembly. However, in the case of the films with 4 wt % NaOH addition, these layers of CNC with chiral nematic orientations were not observed. The SEM images of this sample, presented in FIG. 4, panels (c) and (d), show few rods orienting out of plane, whereas most CNC rods are in the plane. This indicates that there is some level of global alignment of the CNC rods in the film upon addition of the NaOH. This is also supported by the cross-polarized optical microscopy images discussed below. Similar morphology of CNC rods was observed for the 10 wt % CNC/SKL films shown in FIG. 4, panels (e) and (f). In these two panels, uniform distribution of lignin particles could be seen across the film thickness. Uniform and homogenous lignin dispersion was also observed in the case of 10 wt % CNC/AL and 10 wt % CNC/acetylated-SKL (Ac-SKL) films (data not shown). Acetylation of SKL did not affect its morphology and dispersibility in CNC matrix.

Figure 5:
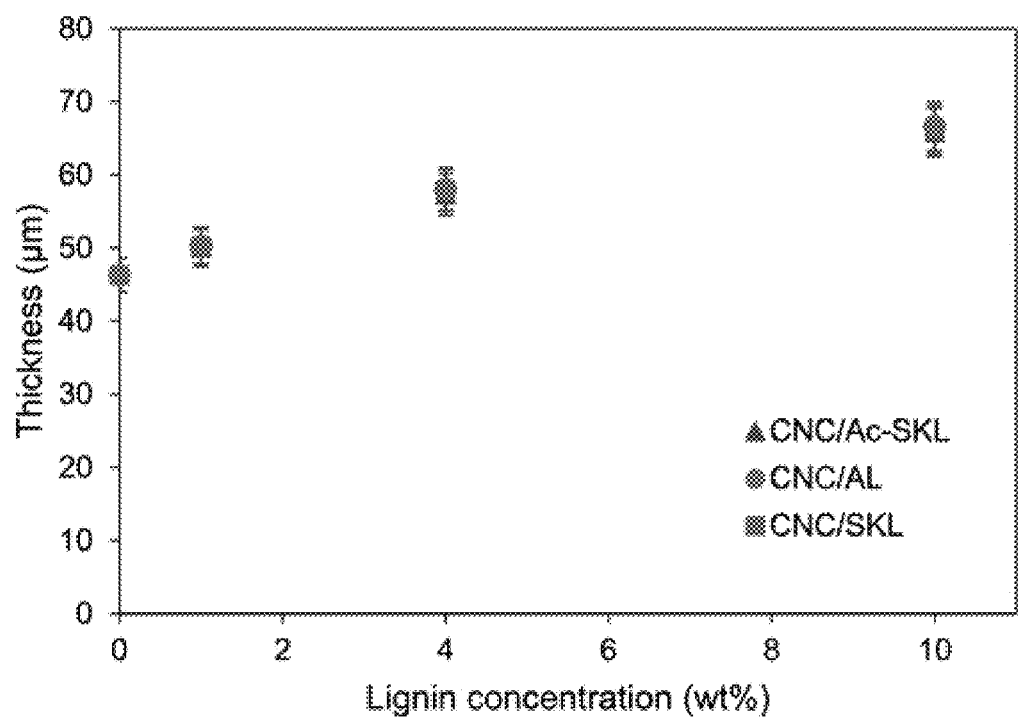
FIG. 5 is a graph showing the thickness of the composite films with various lignin concentrations.

The thickness of the films increased linearly with the increase in lignin concentration. See FIG. 5, which plots the thickness of the films versus the lignin concentration in wt %. CNC/AL, CNC/SKL, and CNC/Ac-SKL films had similar thicknesses at the same lignin concentrations. The average thickness of the CNC films was 46.3 µm, which increased to 67 µm upon 10 wt % lignin addition.

Optimization of Film Transparency:

To enhance the scope of CNC/lignin films in applications requiring transparent UV-protection properties, it is desirable to maximize visible light transmission and precisely control the UV light blocking. Because adding NaOH influences the film transparency, its concentration in suspension needed to be optimized to get the maximum visible transparency in the film. For this purpose, 1.64 wt % aqueous CNC suspensions with various NaOH concentrations ranging from 0.5 to 15 wt % were prepared. These suspensions were characterized for the ζ potential and average CNC particle size using a Malvern "ZETASIZER"®-brand device (Malvern Panalytical Ltd., Malvern, United Kingdom). The corresponding films were also characterized for UV-visible transmission.

Figure 6A:
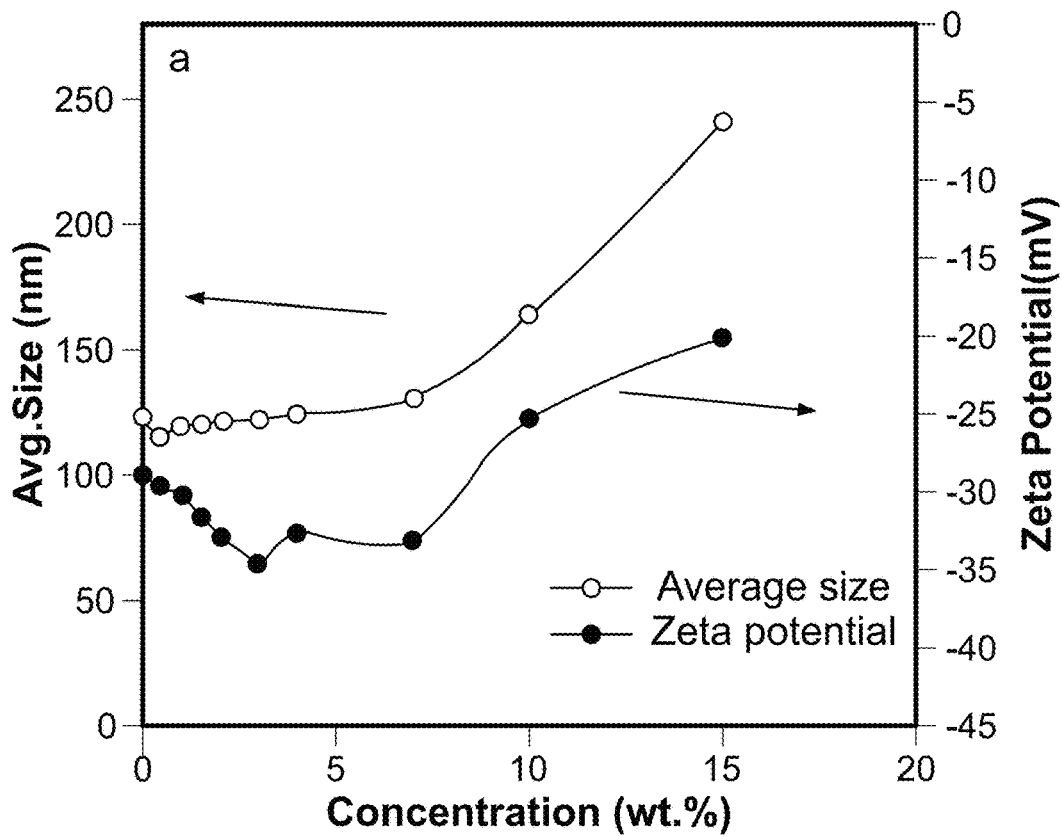
FIG. 6A is a graph depicting average particle size and potential measurements of 1.64 wt % aqueous alkaline CNC suspension with various NaOH additions.
Figure 6B:
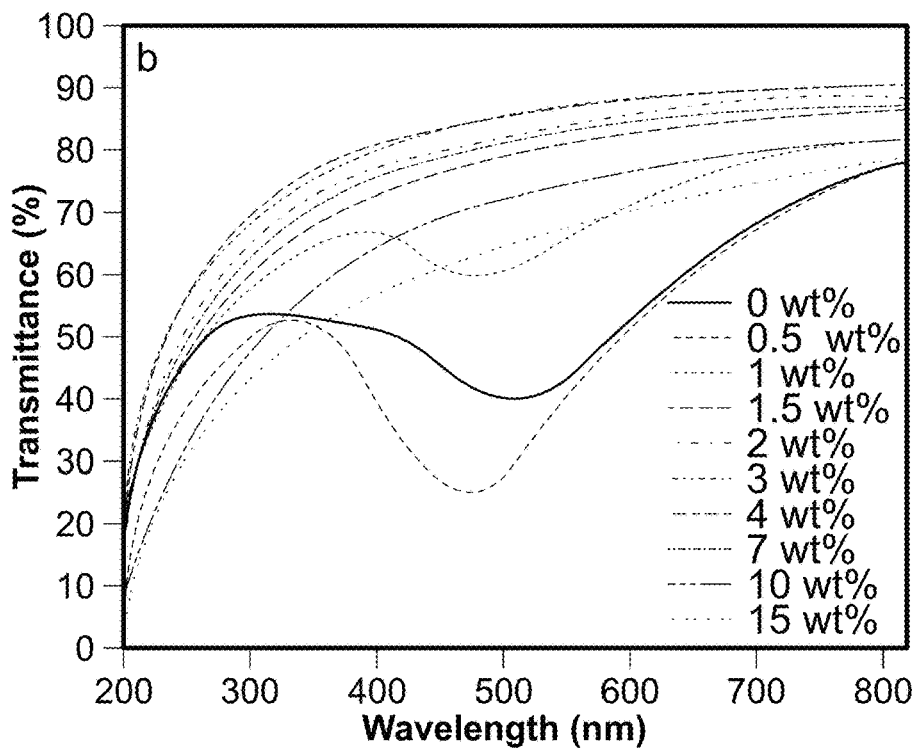
FIG. 6B is a graph depicting transmission spectra for the CNC films with various NaOH additions.
Figure 7:
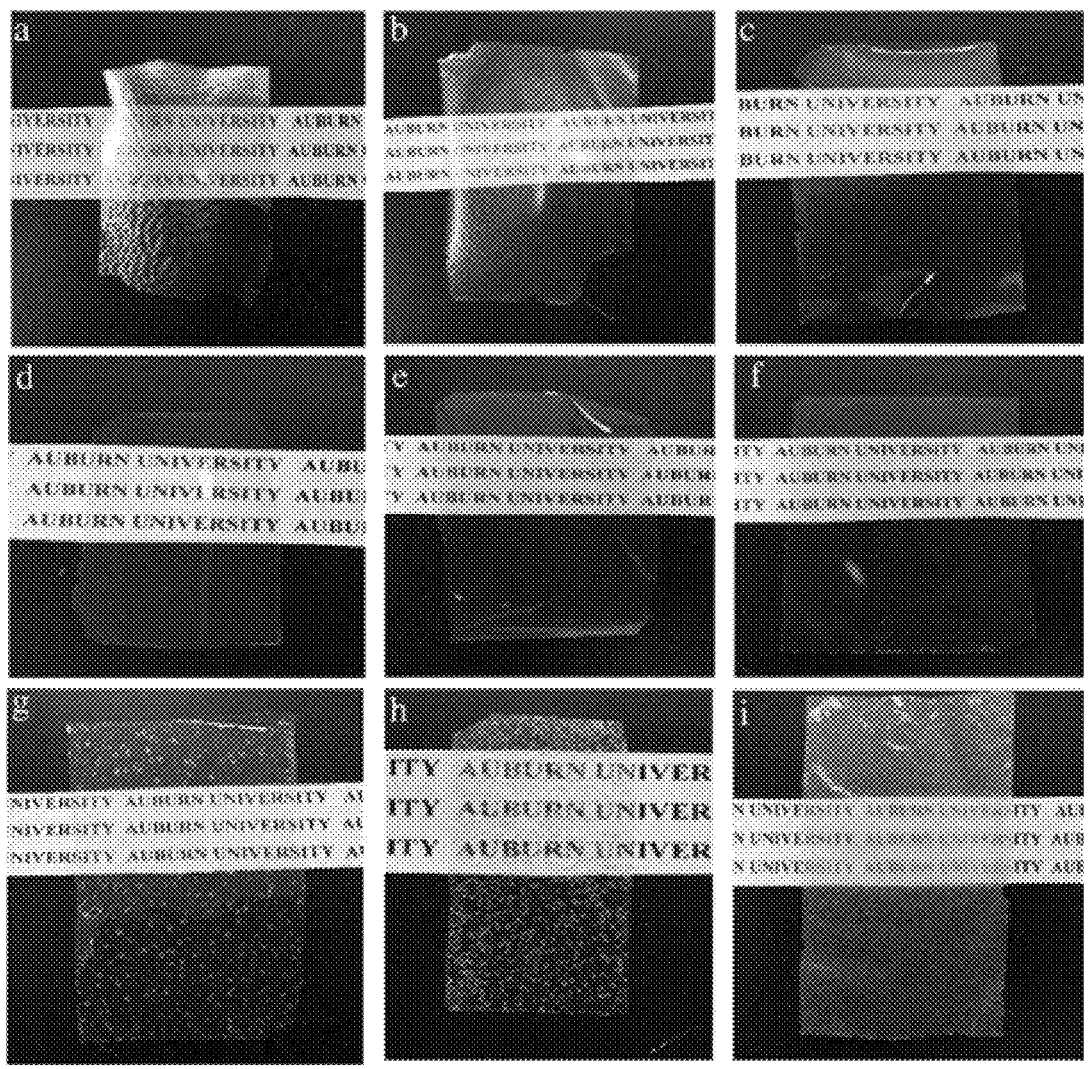
FIG. 7 is a series of photographs of CNC films at various NaOH concentrations: panel (a) 0.5 wt %, panel (b) 1 wt %, panel (c) 1.5 wt %, panel (d) 2 wt %, panel (e) 3 wt %, panel (f) 4 wt %, panel (g) 7 wt %, panel (h) 10 wt %, and panel (i) 15 wt %.

As shown in FIG. 6A, adding NaOH influenced the size and the ζ potential of the CNC particles in suspension. It was clearly observed that ζ potential and average particle size of the CNC slightly increased up to about 7 wt % NaOH addition; however, drastic changes in these parameters were observed at higher NaOH concentrations. A small decrease in the average particle size at 0.5 wt % NaOH addition was observed, which may have arisen from compression of the electrical double layer of CNC. Small concentration of sodium ions can cause shrinkage of effective particle size through shielding of the surface charge on CNC. This exposes its twisted morphology thereby manifesting the formation of chiral nematic ordering. Iridescence of the films (see FIG. 7, panels (a) and (b)) and their characteristic transmission spectra, shown in FIG. 6B, indicate that this morphology of the CNC was retained until about 1 wt % NaOH addition. At 1.5 wt % NaOH concentration, increase in double layer would obscure the chiral morphology by making the effective rods straight and smooth, which results in loss of iridescence, as shown in FIG. 7, panel (c). At concentrations more than 4 wt % NaOH, the negative charge on the CNC surface is completely screened by an increase in the double layer thereby reducing the absolute ζ potential. When the absolute value of ζ potential is less than 30 mV, the van der Waals force dominates the electrostatic repulsion and thus charged particles tend to aggregate causing a drastic increase in particle size. Note that FIG. 7 presents photographs of the entire series of cast films at increasing concentration of NaOH: (a) 0.5 wt %, (b) 1 wt %, (c) 1.5 wt %, (d) 2 wt %, (e) 3 wt %, (f) 4 wt %, (g) 7 wt %, (h) 10 wt %, and (i) 15 wt %. These same films (pictured in FIG. 7) where used to generate the thickness measurements shown in FIG. 6A and the visible transmission spectra shown in FIG. 6B.

The transmission spectra of the films (FIG. 6B) indicates that at lower concentrations of 0.5 and 1 wt % NaOH, a dip in transmittance is observed with minimum transmittance at around 470 nm. This transmission behavior is caused by characteristic reflection of light from the iridescent CNC films. In CNC films with 1.5 wt % NaOH, destruction of chiral nematic structure has led to increased transparency. As shown in FIG. 7, panels (c) through (f) films having a NaOH concentration range of from about 1.5 wt % to about 4 wt % were completely transparent; their transmittance has likewise increased within this range (see FIG. 6B). This likely resulted from the increase in alignment of more nematic domains with NaOH addition. The increase in global alignment of the CNC within the film reduces the variation in refractive index across the film thickness. This in turn increased the visible light transmittance by lowering the dispersive losses in the film. The increased CNC particle size at higher NaOH concentrations caused more scattering of incident light reducing the transparency of resulting films. After 4 wt %, the film transmittance was reduced (FIG. 6B) in accordance with the increased CNC particle size (FIG. 6A) resulting in hazy films. See FIG. 7, panels (g), (h), and (i). On the basis of the maximum optical transmittance and ability to completely solubilize the largest concentration of SKL used in these working examples, 4 wt % NaOH concentration was chosen to prepare additional CNC/lignin films.

Figure 8:
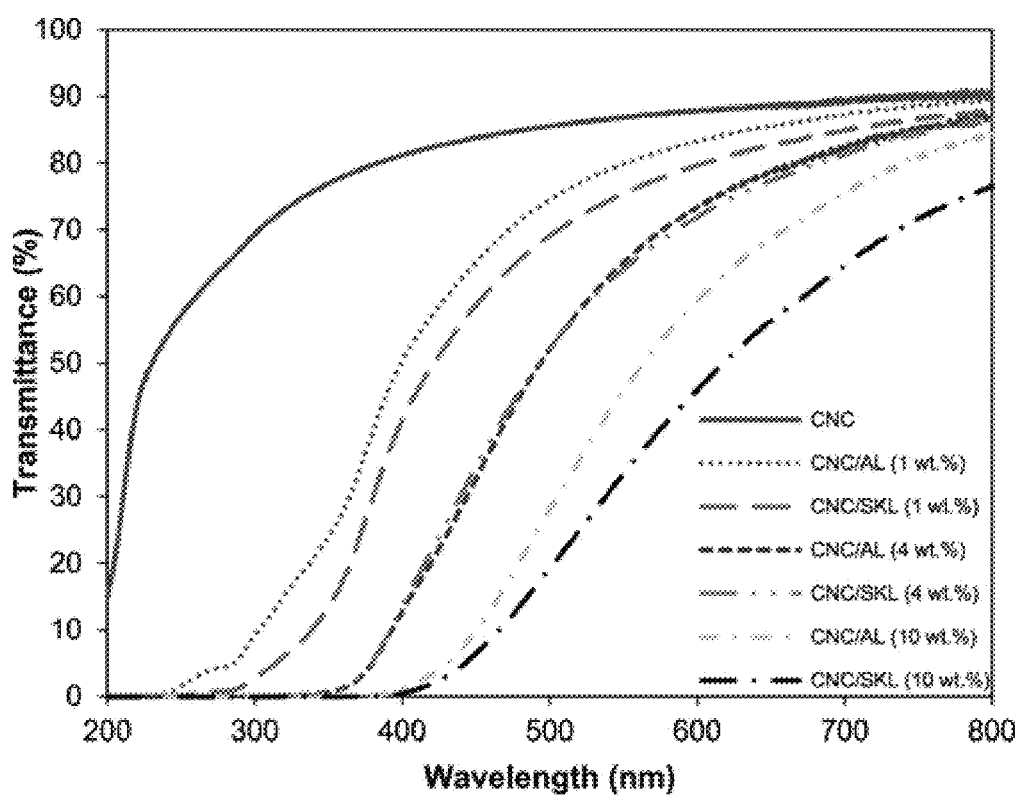
FIG. 8 presents UV-vis transmission spectra of CNC and CNC/lignin films with various lignin concentrations.

UV-Blocking Properties of Film:

Lignin has the ability to absorb the UV light due to its phenolic structure. UV-blocking properties of CNC/AL and CNC/SKL films were characterized via UV transmission spectra after incorporating lignin at various concentrations. The UV-vis transmittance of the films was measured in the wavelength range of 200-800 nm, as shown in FIG. 8.

Transmission spectra include all of the normal incident light on the films exposed perpendicularly to the light source and excluding the absorbed and scattered light. All of the films were prepared using the optimized (4 wt %) concentration of NaOH.

The CNC films showed a higher transmittance in the UV and visible regions. Maximum transmittance for this film was up to about 90%. The homogenous lignin-containing films exhibited high transmittance in the visible spectrum and high absorption in the UV spectrum. As shown in FIG. 8, CNC/SKL films with 1 wt % lignin completely blocked UV-C (200-280 nm) spectrum, whereas CNC/AL (1 wt %) partially blocked UV-C. Increasing the lignin concentration to 4 wt % completely blocked the UV-C and partially blocked the UV-B (280-320 nm) regions for both films. At 10 wt % lignin concentration total UV protection was obtained in the films. These films blocked UV-C, UV-B, and UV-A (320-400 nm) spectra. At this lignin concentration, visible light transmittance for CNC/AL films was slightly higher than for CNC/SKL films.

Sun protection factor (SPF) was also estimated using the method used by Dutra et al., "Determination of sun protection factor (SPF) of sunscreens by ultraviolet spectrophotometry," Rev. Bras. Cienc. Farm. 2004, 40, 381-385. SPFs of the 1 wt % CNC/AL and CNC/SKL films were 10.6 and 13.4, respectively, which indicates UV-B protection equal to 100–(100/SPF), which is close to 91 and 93%, respectively. With 4 wt % lignin, UV protection has increased to 97.3 and 97.6% for CNC/AL and CNC/SKL films, corresponding to their SPFs of 36.5 and 41.1.

Figure 9:
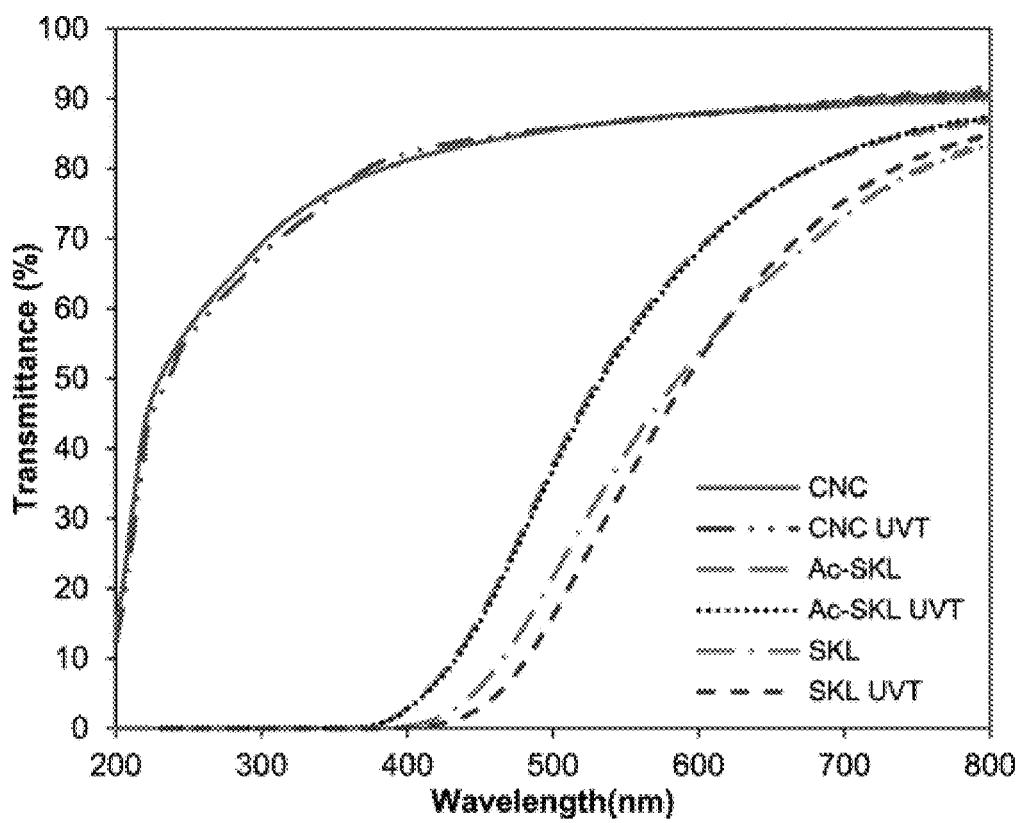
FIG. 9 presents UV-vis transmission spectra of CNC and CNC/lignin films before and after UV (254 nm) exposure for 2 h (UVT refers to UV treated).

Because UV-protection stability of the films plays a large role in determining their service life, the transmission spectra of films before and after a 2 h exposure to UV light were compared for their UV-blocking performance. The results are shown in FIG. 9, which presents the UV-vis transmittance of the CNC and CNC/lignin films before and after the 2 h UV (254 nm) exposure. As shown in FIG. 9, the transmission spectra for CNC and CNC/lignin films did not change after UV exposure. FIG. 9 thus demonstrates that the subject films are highly stable to UV exposure.

Figure 10:
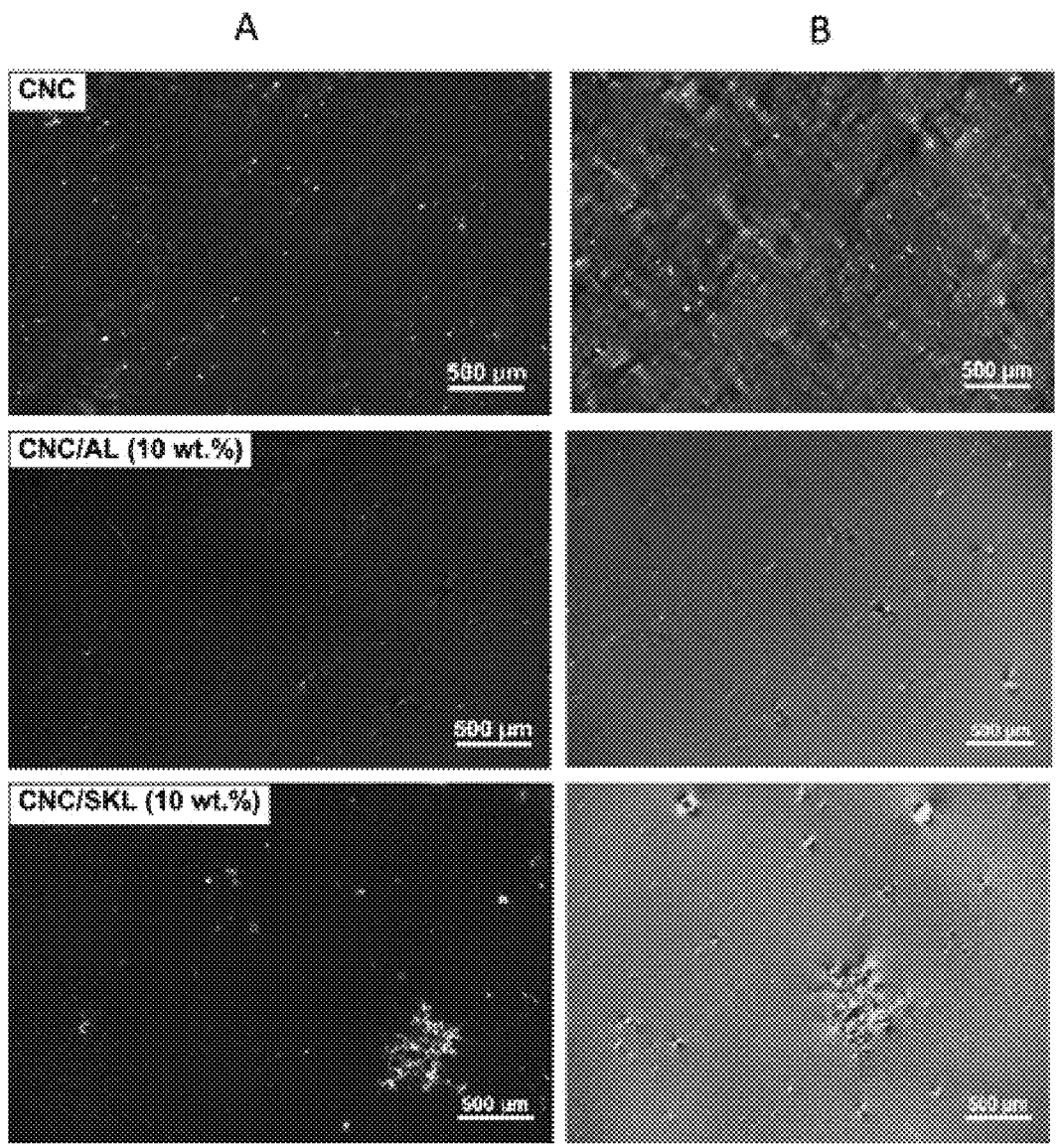
FIG. 10 is a series of cross-polarized reflected images of the CNC and CNC/lignin films. The photos in column A have the CNC alignment parallel to polarizer. The photos in column B have the CNC alignment 45° to the polarizer.

Birefringent Properties of Films:

As discussed previously, the transparency of the CNC film depends on the self-assembly of the CNC rods. The CNC rods in chiral nematic films are helically oriented across the thickness of the film, which exhibits various colors owing to circular polarization of the incident light. In contrast, for films with a fully nematic arrangement of rods, a linear polarization of incident light is achieved. FIG. 10 shows the transmitted cross-polarized optical microscopy images of CNC and CNC/lignin films. These images were taken at two different orientations of the films, which are 45° apart from each other. The images in column A of FIG. 10 were taken with the CNC aligned parallel to the polarizer; the images in column B of FIG. 10 were taken with the CNC aligned 45° to the polarizer. The transmitted light images of the CNC films in these two orientations showed a clear contrast. The overall image appeared dark at 00 position with respect to either polarizer or analyzer. In contrast, strong birefringence occurred when turned to the 45° position. This indicated that there is some degree of alignment of the CNC rods within the film. This can be attributed to the nematic arrangements induced in transition regime concentration. The transition regime concentration is the concentration at which the CNC rods go from a fully isotropic to a fully nematic arrangement. This transition concentration starts at about 4 to 5 wt % without addition of electrolyte and was reduced to about 1 to 2 wt % upon addition of electrolytes. CNC and NaOH concentrations used in this experiment were 1.64 wt % and 16.7 mM NaOH, respectively, which are in an isotropic regime. Although isotropic-to-chiral nematic ordering of CNC rods in this suspension was hindered due to charge screening, the local nematic ordering of rods would be present in these films. Nematic ordering of such CNC domains gives rise to some degrees of overall CNC alignment in the dried films. Interestingly, lignin incorporation did not hinder the NaOH-induced self-assembly of CNC. (See FIG. 4.) The polarizing property of the films adds to the functionality of these films making them potential bio-based film material for use in UV-blocking devices such as sunglasses, contact lenses, windows, etc., where visible light polarization along with UV-blocking properties are desired.

Figure 11A:
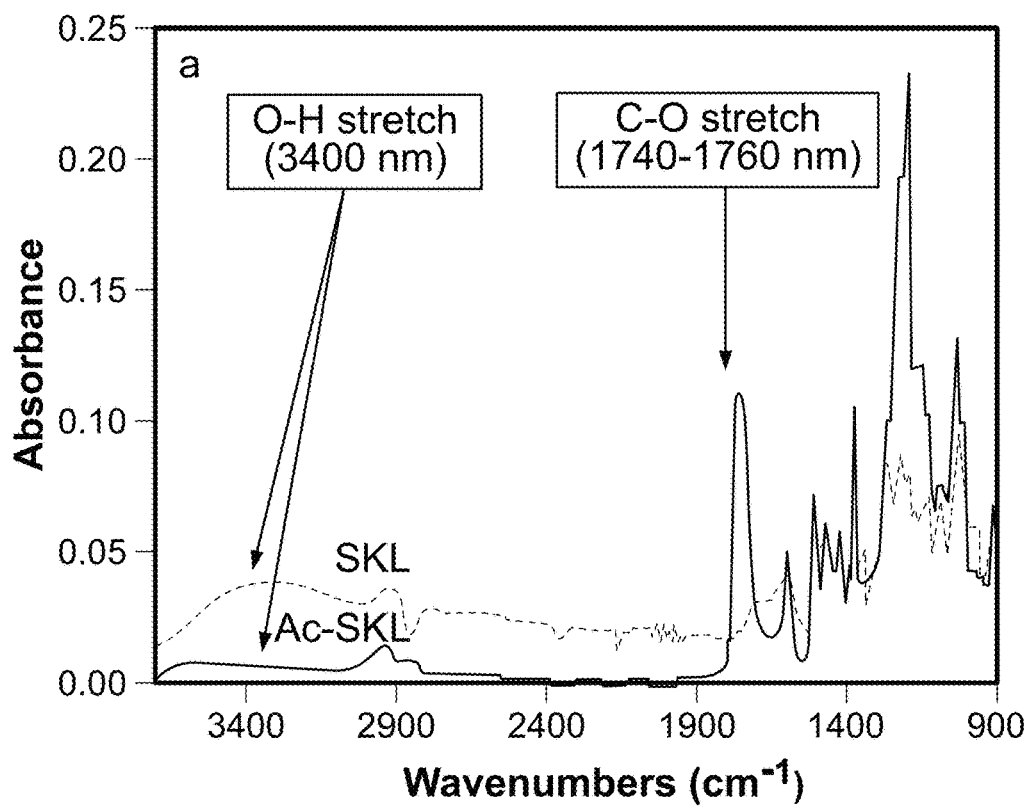
FIG. 11A is a FTIR spectra comparison of SKL and Ac-SKL.
Figure 11B:
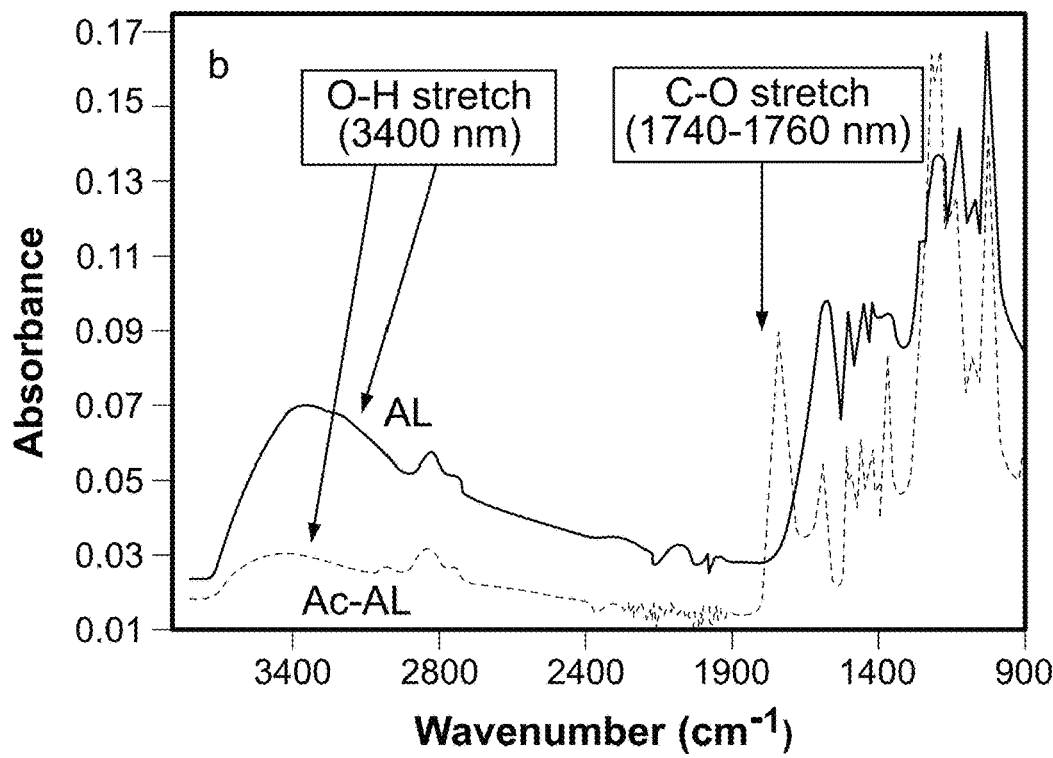
FIG. 11B is a FTIR spectra comparison of AL and Ac-AL.

Lignin Modification to Enhance the Visible Light Transmission:

To improve the scope of optical applications of CNC/lignin films, it is desirable to reduce the lignin color and improve the visible light transmission. Lignin in its natural form mostly occurs as acetylated lignin in hardwoods. However, it is transformed into the familiar dark brown-colored material during its isolation processes. Acetylation of lignin replaces the phenolic hydroxyl groups in lignin with acetyl groups, which reduces the lignin color by preventing the formation of quinone and quinone methide chromophores. AL and SKL acetylation was carried using acetic anhydride and pyridine. The degree of acetylation of the lignin samples was qualitatively determined from their Fourier transform infrared (FTIR) spectra performed before and after acetylation, as shown in FIGS. 11A and 11B. For Ac-SKL samples (FIG. 11A), a stretching vibrational band of the hydroxyl groups between 3200 and 3400 $cm^{-1}$ is eliminated showing complete acetylation of the hydroxyl groups, whereas for Ac-AL samples (FIG. 11B), there is a significant decrease in the peak intensity showing the partial acetylation of the hydroxyl groups. Also, the C=O stretching vibrational absorptions for phenolic and aliphatic acetyls could be observed in Ac-SKL and Ac-AL samples at 1760 $cm^{-1}$ and 1740 $cm^{-1}$, respectively.

Figure 12A:
FIG. 12A is a photograph of a lignin sample before acetylation.
Figure 12B:
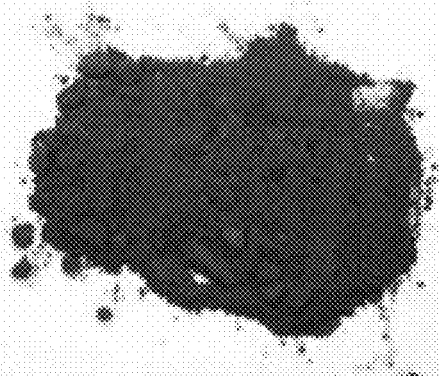
FIG. 12B is a photograph of the same lignin sample after acetylation.

FIGS. 12A and 12B show the change in color obtained after the acetylation of SKL. FIG. 12B shows the unmodified SKL. FIG. 12A shows the acetylated SKL.

Figure 13:
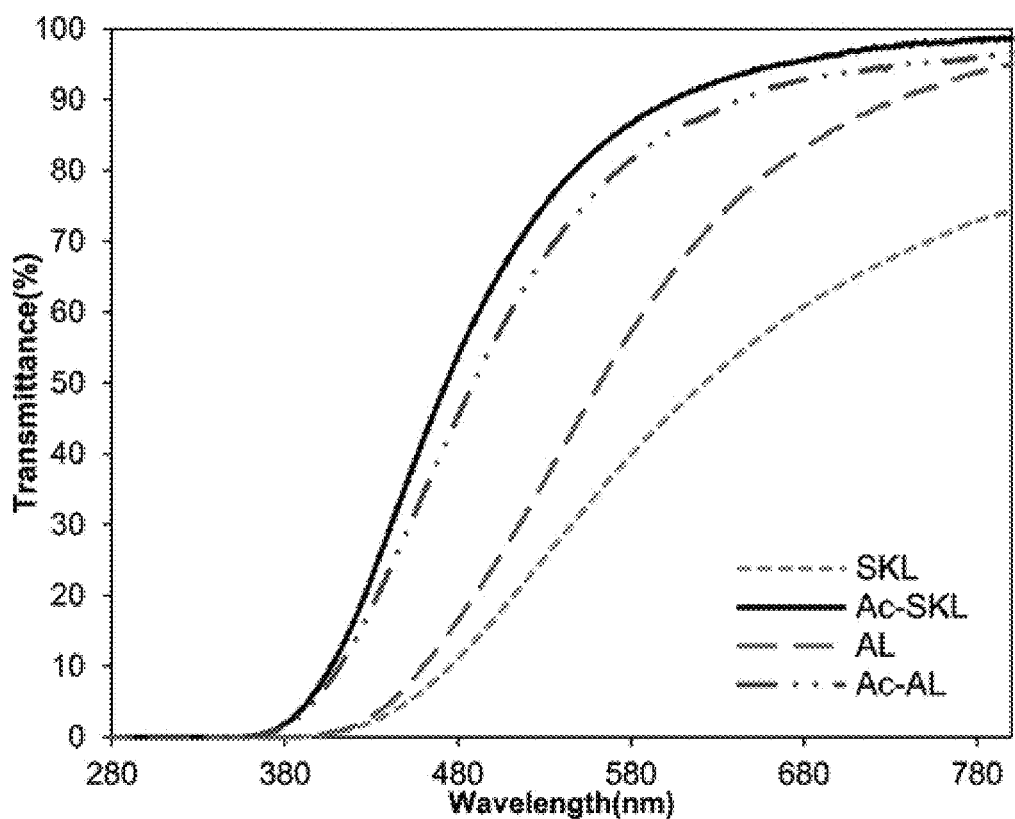
FIG. 13 presents visible transmission spectra of a 0.1 wt % lignin solution in dioxane/water.

FIG. 13 shows the transmission spectra of 0.1 wt % solutions of AL, Ac-AL, SKL, and Ac-SKL were prepared using 1:1 (v/v) dioxane/water solutions. Due to lignin color reduction, the visible light transmission at 550 nm is enhanced by 65% for AL solutions and 160% for SKL solutions. The UV-blocking properties of the lignin are only slightly affected due to the acetylation. The Ac-AL and Ac-SKL can still block UV light up to about 375 nm compared to 400 nm obtained for unmodified AL and SKL. The extinction coefficient values for the lignin samples also showed a slight reduction after the acetylation. See Table 1.

TABLE 1

Extinction Coefficients of the Lignin Samples

| Sample | Extinction Coefficient (wt %$^{-1}$ cm$^{-1}$) at 255 nm |
|---|---|
| AL | 205.3 |
| Ac-AL | 196.6 |
| SKL | 223.8 |
| Ac-SKL | 216.1 |

Figures 14A, 14B:
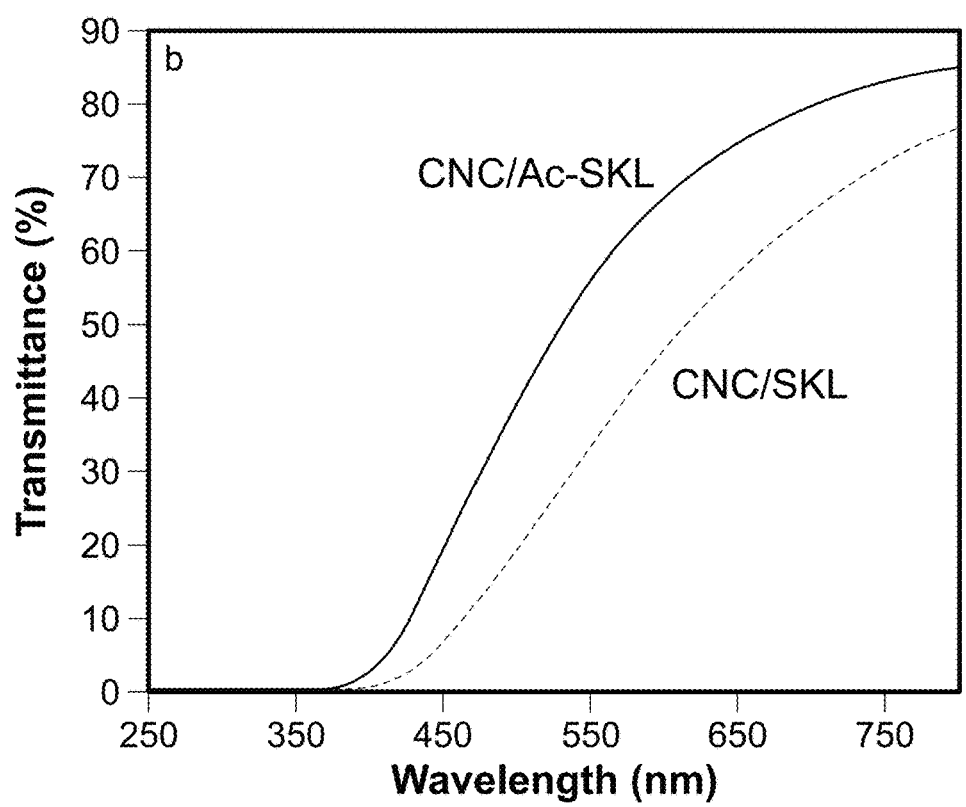
FIG. 14A shows photographs of CNC/SKL (10 wt %) and CNC/Ac-SKL (10 wt %) films.
FIG. 14B presents transmission spectra of comparison for CNC/SKL (10 wt %) and CNC/Ac-SKL (10 wt %).

The UV-absorption properties of lignin are mostly retained due to the retention of its aromatic structure after acetylation. FIGS. 14A and 14B show the effect of lignin acetylation on the transparency (FIG. 14A) and transmission spectra (FIG. 14B) of CNC/lignin films. The visible light transmittance of 10 wt % CNC/Ac-SKL film at 550 nm is enhanced by 67% compared to 10 wt % CNC/SKL film, without significantly affecting the UV-blocking properties.

Figure 15:
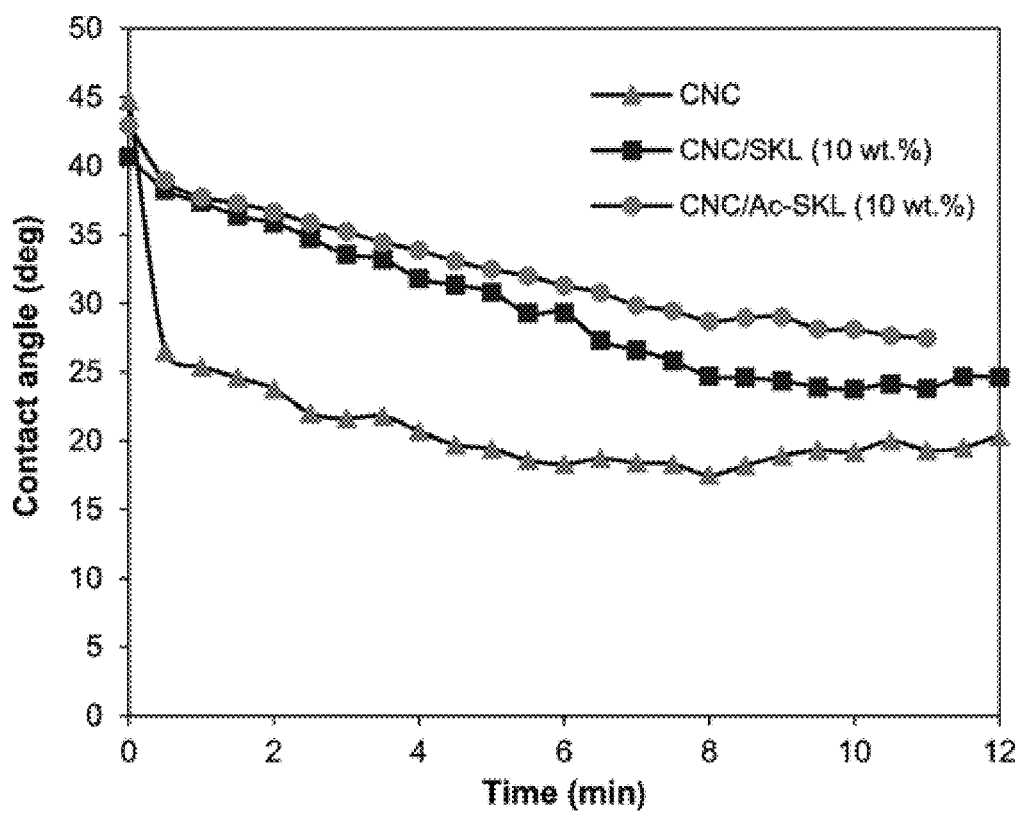
FIG. 15 is a graph showing contact angle measurements for CNC and CNC/lignin samples as a function of time.

Surface Hydrophobicity:

Owing to its aromatic structure and fewer hydroxyl groups as compared to CNC, lignin is generally considered relatively more hydrophobic than CNC. However, no appreciable change in hydrophobicity was observed upon addition of 10 wt % lignin to CNC. Static contact angle did not increase significantly for the CNC/lignin films as compared to the CNC films. Average static contact angles measured for 10 wt % CNC/SKL, 10 wt % CNC/Ac-SKL, and neat CNC samples were in the range of 43±2°. See FIG. 15. However, it was observed that for lignin containing CNC films, the contact angle was more stable than that of neat CNC films. Within first 100 s, the contact angle of 10 wt % lignin containing films, i.e., CNC/Ac-SKL and CNC/SKL reduced to 380, whereas for CNC films contact angle rapidly reduced to 250. In case of CNC films, hydrophilic hydroxyl groups are easily available for interaction with water molecules. The water droplet spreads easily on the surface thereby rapidly reducing the contact angle. For CNC/lignin samples, penetration into the films was reduced by the uniformly dispersed hydrophobic lignin network surrounding the cellulose nanocrystals in the matrix. Unexpectedly, similar initial contact angle of CNC and lignin containing CNC films may be due to low concentration of lignin present on the surface of the film.

Figure 16A:
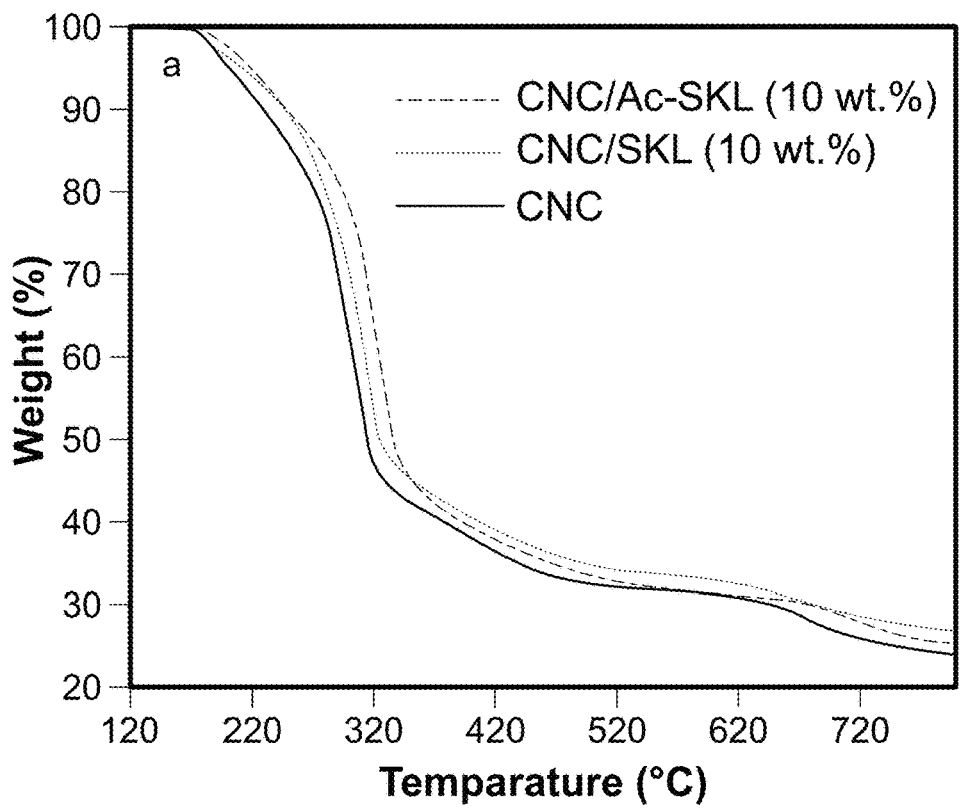
FIG. 16A is a graph showing thermogravimetric analyses (weight percent vs. temperature) for CNC and CNC/lignin films.
Figure 16B:
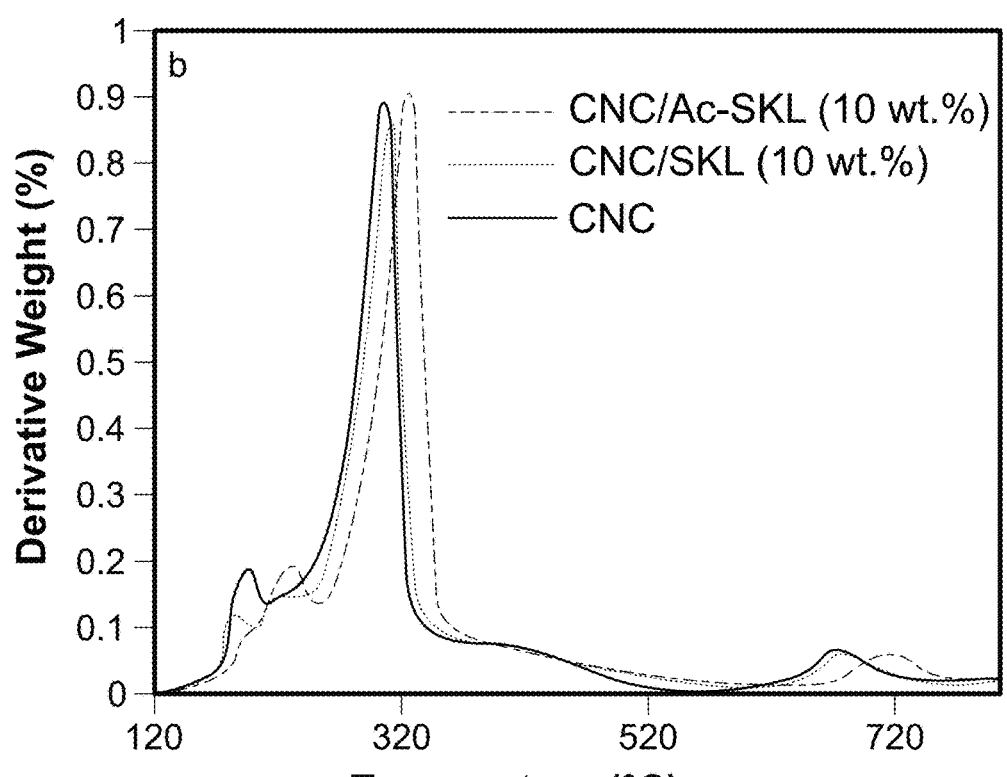
FIG. 16B is a graph showing the corresponding temperature derivative weight percent vs. temperature.

Thermal Stability of the Films:

Thermal decompositions of CNC and CNC/lignin films were studied using thermogravimetric analysis (TGA) in an inert nitrogen medium. Decomposition behavior in terms of weight percent versus temperature is shown in FIG. 16A. Derivative weight percent versus temperature (i.e., a differential thermogravimetric plot; "DTG") is shown in FIG. 16B. The DTG plot in FIG. 16B shows large peaks within a temperature range of about 300° C. to about 330° C., which largely corresponds to pyrolysis of cellulose chains resulting from depolymerization, dehydration, and decomposition of glycosyl units. Similar thermal behavior was obtained for the NaOH-treated sulfonated CNC. Smaller peaks between about 180° C. and about 190° C. for all of the samples correspond to sulfate group decomposition. The peaks around 230° C. seen in CNC/SKL and CNC/Ac-SKL are due to presence of impurities induced in SKL during kraft processing.

The thermal stability of the CNC films is improved upon incorporation of the SKL. FIG. 16A shows more weight loss at any given temperature for the CNC films compared to lignin-containing films. Peak temperature ($T_1$) from the DTG plot (FIG. 16B) corresponding to CNC pyrolysis has shifted to higher temperature upon lignin addition. $T_1$ for neat CNC films is 307° C., which has increased to 312° C. for 10 wt % CNC/SKL and 327° C. for 10 wt % CNC/Ac-SKL. The presence of the phenolic OH groups within the lignin structure and the aromatic char originating from the lignin at elevated temperature are responsible for the thermal stability characteristics of the lignin incorporated in polymer matrix. Acetylation of lignin further enhances the lignin thermal stability due to replacement of hydroxyl groups with more stable acetyl groups in lignin. The increased thermal stability of the nanocomposite films makes lignin-based films a suitable material for applications in severe environmental conditions.

Figure 17:
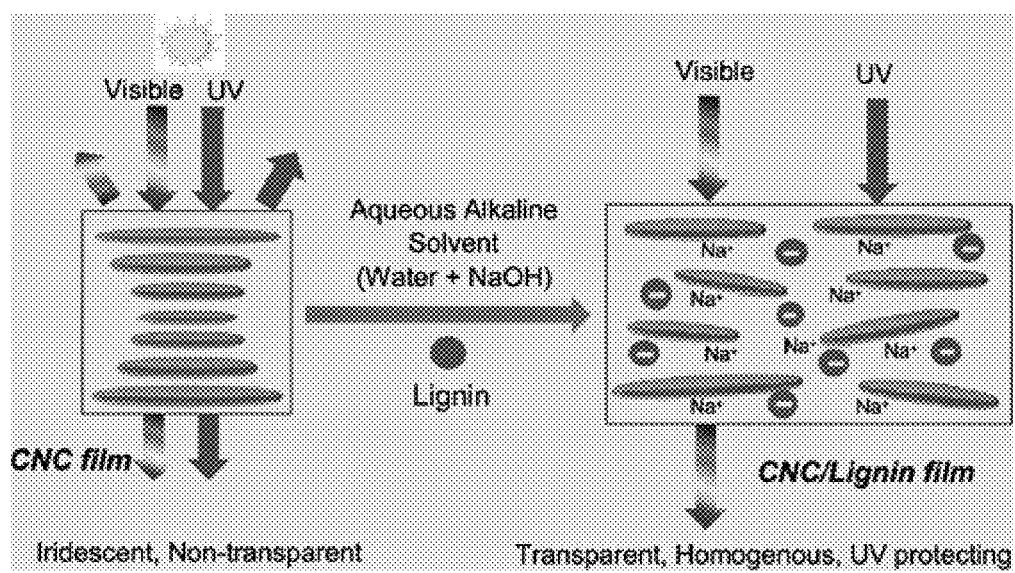
FIG. 17 is a schematic showing a CNC film in the absence of lignin and NaOH (left-hand of schematic) and a corresponding CNC film containing lignin and sodium cations (right-hand of schematic). In contrast to the CNC film, the CNC/lignin film is transparent to visible light, but does not transmit UV light.

FIG. 17 presents an overall schematic representation of the films described herein.

Advantages and Benefits of the Films:

A simple approach to prepare the CNC and lignin-based transparent and homogenous UV-protection films is disclosed. The results demonstrated for the first time that CNC aqueous suspensions with and without containing lignin could be tuned through the addition of NaOH to produce transparent and homogenous films. CNC films were optimized for transparency using various NaOH additions. It was observed that the addition of NaOH in the range of from about 3 to about 4 wt % resulted in the CNC films with maximum transparency. Moreover, NaOH addition enhanced the homogeneity of the films by uniformly dispersing lignin in the films. CNC/AL and CNC/SKL with 10 wt % lignin concentration provided complete UV blocking. The UV-protection behavior of these films was stable under UV irradiation. Acetylation of lignin reduced the lignin color with only slight reduction in their extinction coefficient. Incorporation of 10 wt % Ac-SKL into CNC films increased visible light transmittance at 550 nm by 67% without significantly affecting the UV-blocking property compared to 10 wt % CNC/SKL films. Presence of lignin also provided thermal stability and contact angle stability. SKL addition (10 wt %) increased the maximum weight loss temperature ($T_1$) of CNC by 5° C., whereas 10 wt % Ac-SKL, being more stable, increased $T_1$ by 20° C. Due to the relatively more hydrophobic nature of lignin compared to CNC, contact angle of CNC/lignin films remained stable over time compared to CNC films. Initial contact angle was unaffected by the presence of lignin.

EXAMPLES

The following examples are included solely to provide a more complete description of the films disclosed and claimed herein. The examples are not intended to limit the scope of the claims in any fashion.

Materials:

CNC, purchased from the University of Maine Process Development Center, was manufactured at U.S. Forest Service's Cellulose Nanomaterials Pilot Plant at the Forest Products Laboratory, Madison, Wis. The sodium forms of CNC were obtained as an aqueous gel (11.5-12.5 wt %), with crystal dimension specifications in the range of 5-20 nm for width and 150-200 nm for length. Some of the literature values are in agreement with these reported dimensions. See Reid et al., "Benchmarking cellulose nanocrystals: from the laboratory to industrial production," *Langmuir* 2017, 33, 1583-1598 and Heggset et al., "Temperature stability of nanocellulose dispersions," *Carbohydr. Polym.* 2017, 157, 114-121. Reid et al. have reported aspect ratio of this CNC to be ~19 with an average length of 134±52 nm and width 7±2 nm. The SKL (softwood kraft lignin) contained 95 wt % lignin with impurities mainly as residual sugars, sulfur, and ash. NaOH pellets, anhydrous pyridine, acetic anhydride were purchased from TCI America. AL, purchased from the Sigma-Aldrich, is water-soluble lignin with low sulfonate content with an average molecular weight of ~10 000 Da.

Acetylation of Lignin:

The purpose of lignin acetylation was to replace lignin hydroxyl groups with acetyl groups to reduce the dark lignin color, which is partly caused by chromophores arising from phenolic hydroxyl groups, such as quinone and quinonemethides. SKL (1 g) was dissolved in a mixture of pyridine (10 mL) and acetic anhydride (10 mL) and stirred at room temperature for 72 h. See Cachet et al, "Esterification of organosolv lignin under supercritical conditions," *Ind. Crops Prod.* 2014, 58, 287-297, and Gilarranz et al, "Phenolic OH group estimation by FTIR and UV spectroscopy, Application to organosolv lignins," *J. Wood Chem. Technol.* 2001, 21, 387-395. The reaction mixture was then added dropwise into a 500 mL of ice water to precipitate the acetylated lignin. Subsequently, followed by filtration and repeated washing with ice water and ethanol.

Film Preparation:

CNC films were prepared by mixing 1 g of CNC in 60 mL of deionized (DI) water with or without addition of NaOH, whereas CNC/lignin films were prepared by suspending 1 g of CNC in 30 mL of DI water, which was mixed for 30 min using magnetic stirrer. Separately, required quantity of lignin was mixed in a 30 mL of DI water with an addition of 240 mg of 5 M aqueous NaOH solution. The aqueous alkaline lignin solution was mixed for 30 min to completely dissolve all of the lignin without having any large visible aggregates. CNC suspension and lignin solution were then mixed together for another 30 min to get the uniform mixture of the CNC/lignin. This mixture was then casted on polystyrene Petri dishes and dried at room temperature in a fume hood for 48 h to obtain the uniform, transparent CNC/lignin films. CNC/acetylated-SKL (Ac-SKL) films were prepared using the similar procedure. However, in this case, Ac-SKL was solubilized in 30 mL of dioxane and CNC is suspended in 30 mL of DI water, before mixing these mixtures together. NaOH solution (240 mg, 5 M) was added to this mixture. These films were dried on a Teflon mold in fume hood for 48 h. NaOH and lignin concentration wherever mentioned throughout this disclosure are wt % based on the total weight of 1 g of CNC instead of mixture weight. This was used for convenience as each film is prepared from 1 g of CNC.

UV-Vis Spectroscopy:

Transmission spectra of the aqueous lignin solutions and CNC/lignin films were carried out using a Thermo Scientific GENESYS 10S UV-vis spectrometer in the wavelength range of 200-800 nm. Transmittance at the wavelength of 550 nm was used as a measure of film transparency. Sun protection factor was calculated using absorbance within UV-B range (290-320 nm). Extinction coefficient (E) of the lignin and acetylated lignin was calculated using Beer-Lambert equation as follows $$\varepsilon_\lambda = \frac{A_\lambda}{C \cdot d}$$

where $\varepsilon_\lambda$ (wt %$^{-1}$ cm$^{-1}$) is an extinction coefficient measured using absorbance $A_\lambda$, which is a maximum peak absorbance at wavelength ($\lambda$=255 nm). d is the path length for the incident light, which is 1 cm in this case, and C (wt %) is the concentration of lignin solution.

Fourier Transform Infrared Spectroscopy:

Fourier transform infrared (FTIR) spectra of the lignin samples were measured on a Nicolet 6700 FTIR spectrometer by Thermo Scientific. A total of 64 cumulative scans in absorption mode was taken, with a resolution of 1 cm$^{-1}$ in the frequency range 4000-600 cm$^{-1}$.

Atomic Force Microscopy (AFM):

AFM images of CNC/lignin films were performed under ambient conditions on a commercial AFM (Pacific Nanotechnology Nano-R AFM, Pacific Nanotechnology, Santa Clara, Calif.) in noncontact mode using aluminum AFM tips with resonant frequencies in the range of 150-210 kHz and force constants in the range of 4.5-14 N m$^{-1}$ (MikroMasch, Wilsonville, Oreg.). Images are collected at a scan rate of 0.5 or 1 Hz depending on the image size with resolution of 256×256 data points. The RMS roughness of films was obtained from 10 μm×10 μAFM scans.

Scanning Electron Microscopy (SEM):

SEM images of CNC and CNC/lignin films were taken using a JEOL (Tokyo, Japan) 7000-F field-emission scanning electron microscope. Films were sputter-coated with gold before taking images.

Optical Microscopy:

Cross-polarized images of CNC and CNC/lignin films were taken using a Nikon (Melville, N.Y.) Eclipse 80i microscope with an LU Plan Fluor 4×/0.13NA Nikon objective lens and a Nikon DS-Ri2 microscope camera. Each film was placed between the cross-polarizers, and images were taken in direction oriented at 0 and 45° to the polarization axis.

ζ Potential and Particle Size Measurement:

The dynamic light scattering ("ZETASIZER" ®-brand Nano ZS, Malvern Instrument) was used to determine the ζ potential and CNC particle size in aqueous suspension as a function of NaOH concentration. Dilute CNC suspensions of 1.64 wt % with various NaOH concentrations (0-15 wt % of the CNC weight) were prepared by magnetically stirring the suspension mixture for 2 h. All measurements were carried out at 25° C. with at least three experiments for each sample.

Contact Angle Measurements:

Static contact angle of the films was measured on a Ramé-Hart model 200 automated goniometer, using DROPimage standard software provided by Ramé-Hart. Measured contact angle was an average of three readings obtained for the water droplets, the measurement error is ±2°.

Thickness Tester:

The thickness of the films was measured using the thickness tester from Testing Machine Inc. Reported thickness values were an average of at least 15 measurements along the film diameter.

Thermal Analysis:

Thermogravimetric analysis (TGA) was performed on a TGA Q500 (TA instruments) under nitrogen at a rate of 10° C. min$^{-1}$ from room temperature to 800° C., with 20 min isothermal step at 120° C. to ensure the removal of residual moisture.

What is claimed is:

1. A composition of matter prepared by a process comprising:
   (a) dispersing cellulose nanocrystals and lignin in an aqueous, alkaline solution comprising NaOH dissolved in water to yield a dispersion;
   (b) casting the dispersion of step (a) onto a substrate; and then
   (c) evaporating the aqueous, alkaline solution for a time and at a temperature to yield a homogeneous, visibly transparent film that at least partially absorbs ultraviolet (UV) radiation falling within a wavelength range selected from the group consisting of ultraviolet A (UVA, about 315 nm to about 400 nm), ultraviolet B (UVB, about 280 nm to about 315 nm) and ultraviolet C (UVC, about 100 nm to about 280 nm).

2. The composition of matter of claim 1, wherein in step (a), the aqueous, alkaline solution further comprises an aprotic solvent.

3. The composition of matter of claim 1, wherein step (a) comprises:

(i) dispersing the cellulose nanocrystals in a first solvent comprising water to yield a first dispersion;
(ii) dispersing the lignin in a second solvent comprising an aprotic solvent to yield a second dispersion;
(iii) combining at least a portion of the first dispersion with at least a portion of the second dispersion to yield a third dispersion; and then
(iv) adding a base to the third dispersion to yield the dispersion of step (a).

4. The composition of matter of claim 1, wherein in step (a) the aqueous, alkaline solution comprises from 0.5 wt % NaOH to 15 wt % NaOH based on the weight of cellulose nanocrystals in the dispersion.

5. The composition of matter of claim 1, wherein in step (a) the aqueous, alkaline solution comprises from 1 wt % NaOH to 10 wt % NaOH based on the weight of cellulose nanocrystals in the dispersion.

6. The composition of matter of claim 1, wherein the lignin is present in the dispersion in a concentration of from about 1 wt % lignin to 10 wt % lignin based on the weight of cellulose nanocrystals in the dispersion.

7. The composition of matter of claim 1, wherein the lignin is present in the dispersion in a concentration of from 1 wt % lignin to 5 wt % lignin based on the weight of cellulose nanocrystals in the dispersion.

8. A composition of matter prepared by a process comprising:
(a) dispersing cellulose nanocrystals and lignin in an aqueous, alkaline solution comprising NaOH dissolved in water to yield a dispersion;
(b) casting the dispersion of step (a) onto a substrate; and then
(c) evaporating the aqueous, alkaline solution for a time and at a temperature to yield a homogeneous, visibly transparent film that at least partially absorbs ultraviolet (UV) radiation falling within a wavelength range selected from the group consisting of ultraviolet A (UVA, about 315 nm to about 400 nm), ultraviolet B (UVB, about 280 nm to about 315 nm) and ultraviolet C (UVC, about 100 nm to about 280 nm);
wherein the cellulose nanocrystals are present in the dispersion in a concentration of from 1 wt % cellulose nanocrystals to about 10 wt % cellulose nanocrystals based on the weight of the aqueous, alkaline solution.

9. A method of making a visibly transparent, UV-blocking film, the method comprising:
(a) dispersing cellulose nanocrystals in an aqueous, alkaline solution to yield a dispersion;
(b) casting the dispersion of step (a) onto a substrate; and then
(b) evaporating the aqueous, alkaline solution for a time and at a temperature to yield a homogeneous, visibly transparent film that at least partially absorbs ultraviolet (UV) radiation falling within a wavelength range selected from the group consisting of ultraviolet A (UVA, about 315 nm to about 400 nm), ultraviolet B (UVB, about 280 nm to about 315 nm) and ultraviolet C (UVC, about 100 nm to about 280 nm).

10. The method of claim 9, wherein in step (a) further comprises dispersing lignin in the aqueous, alkaline solution.

11. The method of claim 9, wherein in step (a), the aqueous, alkaline solution comprises NaOH dissolved in water.

12. The method of claim 9, wherein in step (a), the aqueous, alkaline solution comprises NaOH dissolved in a mixture of water and an aprotic solvent.

13. The method of claim 9, wherein step (a) further comprises dispersing lignin in the aqueous, alkaline solution and the lignin is selected from the group consisting of acetylated lignin, alkaline lignin, and softwood kraft lignin.

14. The method of claim 9, wherein step (a) comprises:
(i) dispersing the cellulose nanocrystals in a first solvent comprising water to yield a first dispersion;
(ii) dispersing lignin in a second solvent comprising an aprotic solvent to yield a second dispersion;
(iii) combining at least a portion of the first dispersion with at least a portion of the second dispersion to yield a third dispersion; and then
(iv) adding an alkaline, aqueous solution to the third dispersion to yield the dispersion of step (a).

15. The method of claim 9, wherein in step (a) the aqueous, alkaline solution comprises from 0.5 wt % NaOH to about 15 wt % NaOH based on the weight of cellulose nanocrystals in the dispersion.

16. The method of claim 9, wherein the lignin is present in the dispersion in a concentration of from 1 wt % lignin to about 10 wt % lignin based on the weight of cellulose nanocrystals in the dispersion.

17. The method of claim 9, wherein the lignin is present in the dispersion in a concentration of from 1 wt % lignin to 5 wt % lignin based on the weight of cellulose nanocrystals in the dispersion.

18. The method of claim 9, wherein the cellulose nanocrystals are present in the dispersion in a concentration of from 1 wt % cellulose nanocrystals to 10 wt % cellulose nanocrystals based on the weight of the aqueous, alkaline solution.

\* \* \* \* \*